US012596559B2

(12) United States Patent
Liguori et al.

(10) Patent No.: US 12,596,559 B2
(45) Date of Patent: Apr. 7, 2026

(54) TECHNIQUES FOR PERFORMING CONTINUATION WORKFLOWS BY TERMINATING VIRTUAL MACHINE BASED ON RESPONSE TIME EXCEEDING THRESHOLD

(71) Applicant: Amazon Technologies, Inc., Seattle, WA (US)

(72) Inventors: Anthony Nicholas Liguori, Bainbridge Island, WA (US); Douglas Stewart Laurence, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/962,958

(22) Filed: Oct. 10, 2022

(65) Prior Publication Data

US 2023/0036900 A1      Feb. 2, 2023

Related U.S. Application Data

(63) Continuation of application No. 16/366,976, filed on Mar. 27, 2019, now Pat. No. 11,467,858.

(51) Int. Cl.
*G06F 9/455* (2018.01)
*G06F 9/50* (2006.01)
(Continued)

(52) U.S. Cl.
CPC ...... *G06F 9/45516* (2013.01); *G06F 9/45558* (2013.01); *G06F 9/5038* (2013.01);
(Continued)

(58) Field of Classification Search
None
See application file for complete search history.

(56) References Cited

U.S. PATENT DOCUMENTS 5,987,422 A     11/1999   Buzsaki
7,272,816 B2    9/2007    Schulz et al.
(Continued)

OTHER PUBLICATIONS

L. Assuncao and J. C. Cunha, "Dynamic Workflow Reconfigurations for Recovering from Faulty Cloud Services," 2013 IEEE 5th International Conference on Cloud Computing Technology and Science, Bristol, UK, 2013, pp. 88-95, doi: 10.1109/CloudCom. 2013.19. (Year: 2013).*
(Continued)

*Primary Examiner* — Abu Zar Ghaffari
(74) *Attorney, Agent, or Firm* — Davis Wright Tremaine LLP

(57) ABSTRACT

A first instance is caused to execute software code to perform a first portion of a workflow in response to receipt of a workflow request, and performance of the first portion results in submission of an operation request to an entity. A resume workflow request is received from the entity, where the resume workflow request includes a handle to a snapshot that corresponds to a state of execution of the software code and a response to the operation request to the entity. Using the handle to the snapshot and the response to the operation request, a second instance is caused to execute the software code from the first state to perform a second portion of the workflow. A workflow result is received from an instance that executes a last portion of the workflow, and the workflow is provided result in response to the workflow request.

20 Claims, 9 Drawing Sheets

(51) Int. Cl.
    *G06F 9/54*          (2006.01)
    *G06Q 10/0633*     (2023.01)

(52) U.S. Cl.
    CPC ........... *G06F 9/54* (2013.01); *G06Q 10/0633*
    (2013.01); *G06F 2009/45562* (2013.01); *G06F*
                      *2009/45575* (2013.01)

(56)              References Cited

U.S. PATENT DOCUMENTS

| | | | |
|---|---|---|---|
| 7,653,562 B2* | 1/2010 | Schulz | G06Q 10/0633 |
| | | | 705/7.27 |
| 8,069,439 B2* | 11/2011 | Shukla | G06Q 10/06316 |
| | | | 717/125 |
| 8,181,150 B2* | 5/2012 | Szpak | G06F 8/10 |
| | | | 717/110 |
| 9,047,490 B2 | 6/2015 | Montagut et al. | |
| 9,052,933 B2 | 6/2015 | Astete et al. | |
| 9,069,607 B1 | 6/2015 | Gopalakrishna Alevoor et al. | |
| 9,098,329 B1 | 8/2015 | Shepherd et al. | |
| 9,280,369 B1 | 3/2016 | Kirk et al. | |
| 9,292,342 B2 | 3/2016 | Wolf et al. | |
| 9,448,827 B1* | 9/2016 | Allen | G06F 9/45558 |
| 9,645,847 B1 | 5/2017 | Roth | |
| 9,792,141 B1 | 10/2017 | Sethuramalingam et al. | |
| 9,842,002 B2 | 12/2017 | McGrath et al. | |
| 9,898,329 B1* | 2/2018 | Zhang | G06F 9/45558 |
| 9,992,269 B1* | 6/2018 | Odom | G06F 16/24568 |
| 10,419,379 B2 | 9/2019 | elikyilmaz et al. | |
| 10,521,195 B1 | 12/2019 | Swope et al. | |
| 10,528,367 B1 | 1/2020 | Liu et al. | |
| 10,534,629 B1 | 1/2020 | St. Pierre et al. | |
| 10,909,503 B1* | 2/2021 | Dias | G06N 20/00 |
| 11,467,858 B2 | 10/2022 | Liguori et al. | |
| 2002/0143865 A1* | 10/2002 | Tung Loo | H04L 67/5682 |
| | | | 719/311 |
| 2004/0153350 A1 | 8/2004 | Kim et al. | |
| 2006/0074714 A1* | 4/2006 | Aziz | G16H 40/20 |
| | | | 705/2 |
| 2006/0156157 A1* | 7/2006 | Haselden | G06F 11/0793 |
| | | | 714/746 |
| 2007/0067373 A1* | 3/2007 | Higgins | G06Q 30/00 |
| 2007/0106541 A1 | 5/2007 | Raisanen | |
| 2007/0211674 A1 | 9/2007 | Ragnar Karlberg et al. | |
| 2007/0234358 A1* | 10/2007 | Hattori | G06F 9/45533 |
| | | | 718/1 |
| 2007/0239499 A1 | 10/2007 | Shukla et al. | |
| 2007/0239505 A1 | 10/2007 | Shukla et al. | |
| 2008/0040417 A1 | 2/2008 | Juncker | |
| 2009/0112779 A1 | 4/2009 | Wolf et al. | |
| 2009/0319256 A1 | 12/2009 | Chow et al. | |
| 2010/0023950 A1 | 1/2010 | Fujii | |
| 2011/0010713 A1* | 1/2011 | Matsumoto | G06F 9/45541 |
| | | | 718/1 |
| 2011/0131365 A1 | 6/2011 | Zhang et al. | |
| 2011/0276977 A1 | 11/2011 | van Velzen et al. | |
| 2012/0005659 A1* | 1/2012 | Bonanno | G06F 11/362 |
| | | | 717/129 |
| 2012/0054768 A1 | 3/2012 | Kanna et al. | |
| 2012/0089481 A1* | 4/2012 | Iozzia | H04N 7/16 |
| | | | 726/5 |
| 2012/0151486 A1* | 6/2012 | Owen | G06Q 10/0631 |
| | | | 718/100 |
| 2012/0271797 A1 | 10/2012 | Patil | |
| 2013/0042226 A1 | 2/2013 | Glick et al. | |
| 2013/0067476 A1* | 3/2013 | Rosenberg | G06F 9/4843 |
| | | | 718/100 |
| 2013/0262898 A1 | 10/2013 | Preston et al. | |
| 2014/0019962 A1* | 1/2014 | Litty | G06F 21/56 |
| | | | 718/1 |
| 2014/0149695 A1 | 5/2014 | Zaslavsky et al. | |
| 2014/0164829 A1* | 6/2014 | Borda | G06F 9/485 |
| | | | 714/15 |
| 2014/0208169 A1* | 7/2014 | Randhir | G06Q 10/06 |
| | | | 714/45 |
| 2014/0379879 A1 | 12/2014 | Bartlett et al. | |
| 2015/0121371 A1 | 4/2015 | Gummaraju et al. | |
| 2015/0143064 A1 | 5/2015 | Bhargava et al. | |
| 2015/0143363 A1* | 5/2015 | Gombert | G06F 9/5083 |
| | | | 718/1 |
| 2015/0160971 A1 | 6/2015 | Doi | |
| 2015/0186176 A1* | 7/2015 | Kodi | G06F 9/5027 |
| | | | 718/1 |
| 2015/0206079 A1 | 7/2015 | Sanabria et al. | |
| 2015/0271259 A1* | 9/2015 | Ivanov | H04L 67/1004 |
| | | | 709/223 |
| 2015/0381590 A1 | 12/2015 | Bosko et al. | |
| 2016/0125058 A1 | 5/2016 | Jain et al. | |
| 2016/0191627 A1 | 6/2016 | Huang et al. | |
| 2016/0378372 A1* | 12/2016 | Abali | G06F 9/467 |
| | | | 711/162 |
| 2017/0060639 A1* | 3/2017 | Miller | G06F 9/485 |
| 2017/0147681 A1 | 5/2017 | Tankersley et al. | |
| 2017/0168903 A1 | 6/2017 | Dornemann et al. | |
| 2017/0264567 A1 | 9/2017 | Shetty et al. | |
| 2017/0270440 A1 | 9/2017 | Garcia et al. | |
| 2018/0060129 A1* | 3/2018 | Pai | G06F 9/485 |
| 2018/0107525 A1* | 4/2018 | Govindaraju | G06F 8/60 |
| 2018/0276085 A1 | 9/2018 | Mitkar et al. | |
| 2018/0300173 A1* | 10/2018 | Shimamura | G06F 9/5066 |
| 2018/0302277 A1 | 10/2018 | Shimamura et al. | |
| 2018/0341555 A1 | 11/2018 | Tsao et al. | |
| 2018/0373568 A1* | 12/2018 | Frost | G06F 9/45533 |
| 2019/0087213 A1 | 3/2019 | Matters et al. | |
| 2019/0102209 A1 | 4/2019 | Astete et al. | |
| 2019/0138349 A1* | 5/2019 | Xie | G06F 11/1482 |
| 2019/0318283 A1* | 10/2019 | Kelly | G06Q 10/1095 |
| 2020/0142712 A1 | 5/2020 | Liu et al. | |
| 2020/0143328 A1* | 5/2020 | Chen | G06F 21/629 |
| 2020/0186445 A1 | 6/2020 | Govindaraju et al. | |

OTHER PUBLICATIONS

Assuncao et al. "Dynamic Workflow Reconfigurations for Recovering from Faulty Cloud Services," 2013 IEEE 5th International Conference on Cloud Computing Technology and Science, 2013, pp. 88-95.

International Search Report and Written Opinion mailed Jun. 17, 2020, in International Patent Application No. PCT/US2020/025079, filed Mar. 26, 2020.

European Patent Office Communication pursuant to Article 94(3) EPC issued Sep. 7, 2023, Application No. 20720985.9, 13 pages.

China National Intellectual Property Administration First Office Action dated Dec. 27, 2023, Application No. 202080028908.7, 10 pages.

China National Intellectual Property Office Notifcation on the Grant for Patent Right and Notiication for Patent Registration Formalities dated Jul. 1, 2024, Application No. 2020800289087, 2 pages.

\* cited by examiner

300

800

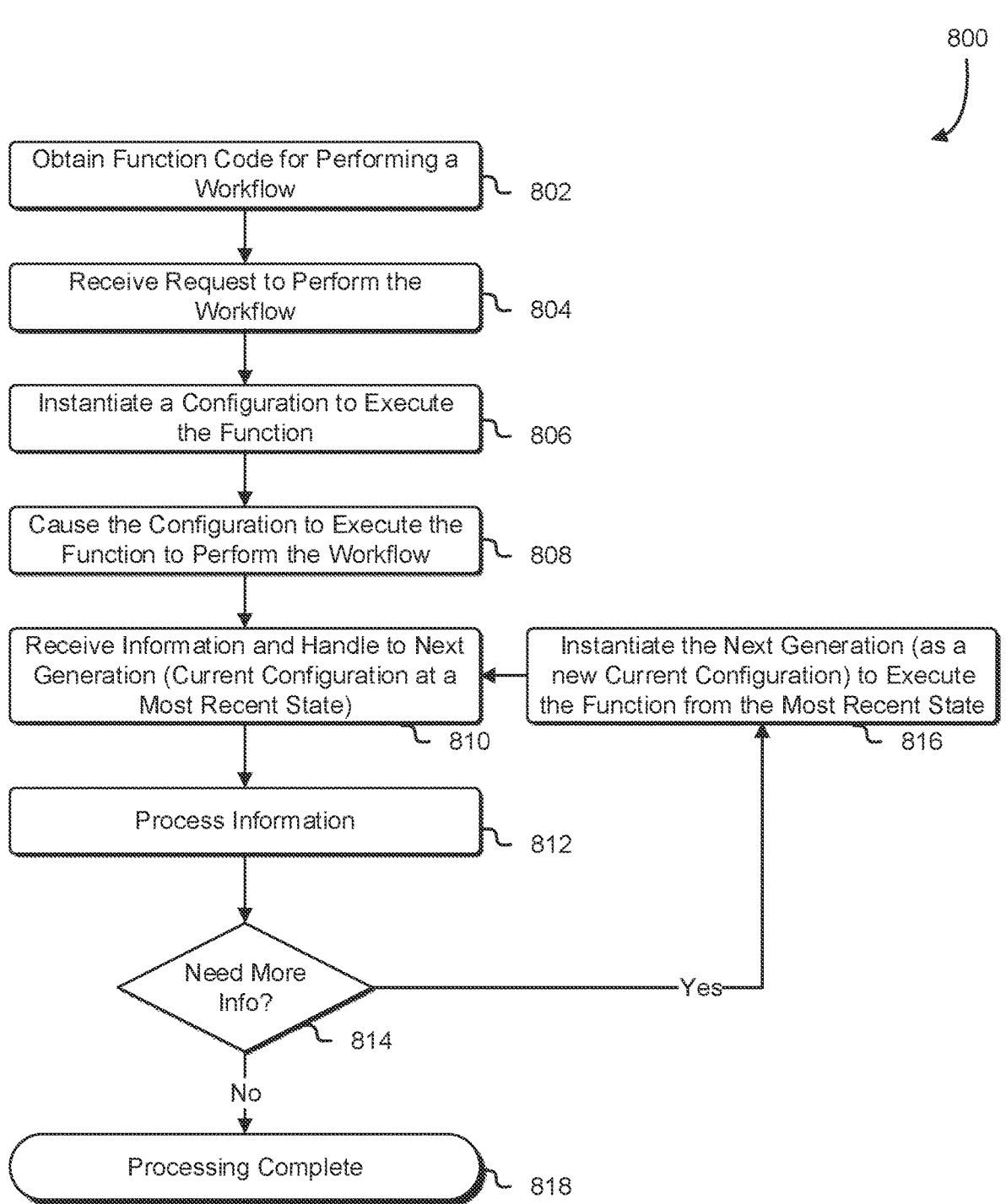

Obtain Function Code for Performing a
Workflow                                          802

Receive Request to Perform the
Workflow                                          804

Instantiate a Configuration to Execute
the Function                                      806

Cause the Configuration to Execute the
Function to Perform the Workflow                  808

Receive Information and Handle to Next
Generation (Current Configuration at a
Most Recent State)                                810

Instantiate the Next Generation (as a
new Current Configuration) to Execute
the Function from the Most Recent State           816

Process Information                               812

Need More
Info?                                             814

Yes

No

Processing Complete                               818

FIG. 8

TECHNIQUES FOR PERFORMING CONTINUATION WORKFLOWS BY TERMINATING VIRTUAL MACHINE BASED ON RESPONSE TIME EXCEEDING THRESHOLD

CROSS REFERENCE TO RELATED APPLICATION

This application is a continuation of Ser. No. 16/366,976, filed Mar. 27, 2019, entitled "TECHNIQUES FOR PERFORMING CONTINUATION WORKFLOWS." This application also incorporates by reference for all purposes the full disclosure of U.S. patent application Ser. No. 16/366, 795, filed Mar. 27, 2019, now U.S. Pat. No. 10,963,287, entitled "REDUCING REQUEST LATENCY IN A MULTI-TENANT WEB SERVICE HOST" and U.S. patent application Ser. No. 16/366,998, filed Mar. 27, 2019, now U.S. Pat. No. 11,366,681, entitled "CHAINING VIRTUAL MACHINES."

BACKGROUND

In various contexts, managing the efficiency and performance of various applications is of utmost importance in many computing services. Computing services often utilize networks of various functions and operations to perform workflows that various applications can require. These functions and operations can often utilize the instantiation of computational systems to perform the workflows various applications require. Additionally, the workflows can require the usage of other services to complete the workflows. The access of such services can result in an idling of the computational systems instantiated to perform the workflows as the services operate to provide responses to the computational systems. This idling can result in an inefficient usage of the computational resources of the computational systems, which must operate while waiting for responses from the services.

BRIEF DESCRIPTION OF THE DRAWINGS

Various techniques will be described with reference to the drawings, in which:

FIG. 8 is a flowchart that illustrates an example of executing a workflow using virtual machine chaining in accordance with an embodiment.

DETAILED DESCRIPTION

Figure 1:
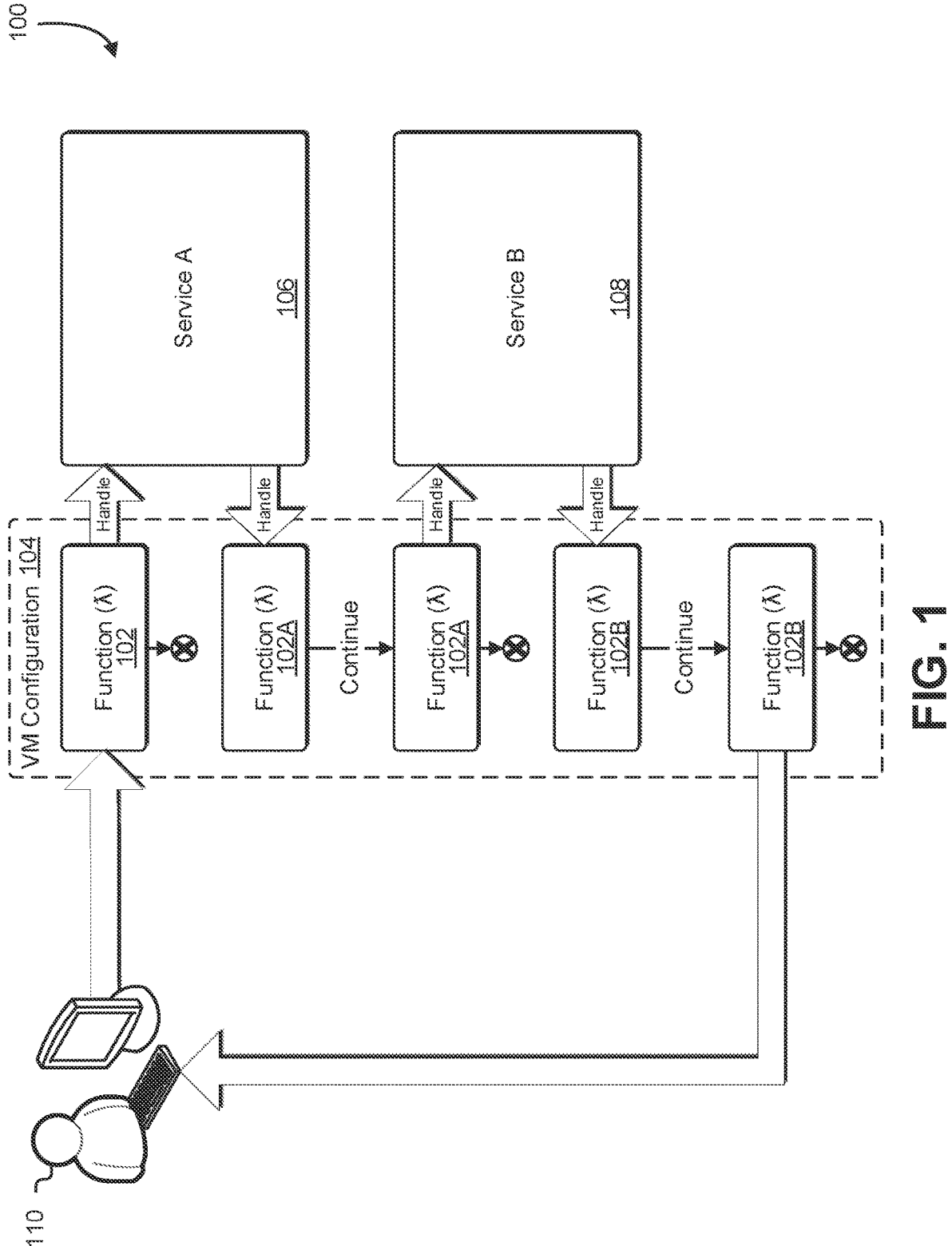
FIG. 1 illustrates an example of a continuation workflow in accordance with an embodiment.

Techniques and systems described below relate to event driven suspend and resume virtual machine configurations that perform a workflow over a series of stages. In one example, a workflow request to perform a workflow is received via an application programming interface. In the example, a first virtual machine instance is caused to execute function code to perform a first portion of the workflow. Performance of the first portion of the workflow, in this example, includes storing a first state of execution of the function code as a first snapshot (e.g., in persistent storage, random access memory (RAM), etc.), receiving a first invoke handle corresponding to the first snapshot, submitting, to a first service, a first service request for first information associated with the workflow, wherein the first service request includes the first invoke handle, and terminating the first virtual machine instance.

In some examples, the term "virtual machine instance" refers to a virtual machine that is instantiated and executing on a host computer system. The virtual machine instances may be used for various purposes, such as to operate as servers supporting a website, to operate business applications or, generally, to serve as compute power for the customer. Other applications for the virtual machine instances may be to support database applications, electronic commerce applications, business applications, and/or other applications.

Still in the example, the first invoke handle and the first information is received from the first service via the application programming interface. Then, in the example, a second virtual machine instance is caused to resume execution of the function code from the first state of execution using the first invoke handle and the first information to perform a second portion of the workflow. Performance of the second portion of the workflow, in this example, includes storing a second state of execution of the function code as a second snapshot (e.g., in the persistent storage, RAM, etc.), receiving a second invoke handle corresponding to the second snapshot, submitting, to a second service, a second service request for second information associated with the workflow, wherein the second service request includes the second invoke handle, and terminating the second virtual machine instance.

Further in the example, the second invoke handle and the second information is received from the second service via the application programming interface. A third virtual machine instance is caused to resume execution of the function code from the second state of execution using the second invoke handle and the second information to perform a third portion of the workflow. Performance of the third portion of the workflow, in this example, includes determining a workflow result based on the first information and the second information, returning the workflow result, and terminating the third virtual machine instance. Finally, in the example, the workflow result is provided in response to the workflow request.

In another example, function code is received that, as a result of being executed by a virtual machine configuration, causes the virtual machine configuration to at least perform at least a portion of a workflow to produce information, generate a snapshot corresponding to a current state of the virtual machine configuration, return the information and an invoke handle to the snapshot, and terminate the virtual machine configuration. A request to perform the workflow is received via an application programming interface.

In the example, the request is fulfilled by at least causing a first virtual machine configuration to be instantiated to execute the function code to perform a first portion of the workflow. Further in fulfillment of the request, first information and the handle is received from the first virtual machine configuration. Still further in fulfillment of the request, a first operation based on the first information is performed. Also in fulfillment of the request, a second virtual machine configuration is caused to be instantiated based on the invoke handle to execute the function code to perform a second portion of the workflow.

Further in fulfillment of the request, second information from the second virtual machine configuration is received. Still further in fulfillment of the request, a second operation is performed based on the second information. Also in fulfillment of the request, a workflow result is determined based on performance of the first operation and the second operation. Finally, the workflow result is provided in response to the request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example of a continuation workflow in accordance with an embodiment. Specifically, FIG. 1 depicts an example 100 of a system in which a customer 110 causes a virtual machine (VM) configuration 104 hosted by a computing resource service provider to perform a workflow that utilizes continuations in a manner described in the present disclosure. In some examples, a computing resource service provider is an entity that provides one or more computing resource services to its customers individually or as a combination of services of a distributed computer system. Examples of types of computing resources provided by the computing resource service providers include infrastructure-as-a-service (IaaS), platform-as-a-service (PaaS), and/or software-as-a-service (SaaS). The one or more computing resource services of the computing resource service provider may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

In some examples, an on-demand data storage service is a collection of computing resources configured to synchronously process requests to store and/or access data. The on-demand data storage service may allow data to be provided in response to requests for the data and may operate using computing resources (e.g., databases) that enable the on-demand data storage service to locate and retrieve data quickly. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects which may be used by the customer to retrieve or perform other operations in connection with the data objects stored by the on-demand data storage service.

Customers of the computing resource service provider, such as the customer 110, may communicate with one or more of the services via an interface, which may be a web services interface or any other type of customer interface. Each service provided by a computing resource service provider may have its own interface, and subsets of the services may have corresponding individual interfaces in addition to, or as an alternative to, a common interface. The customer 110 may communicate with the computing resource service provider through a network, whereby the network may be a communication network, such as the Internet, an intranet, an internet service provider (ISP) network and/or some other such network as described below.

In an embodiment, the customer 110 is any entity operable to access systems such as the VM configuration 104. In some examples, the customer 110 is an individual, group of individuals, business entity or other organization that has a business relationship with the computing resource service provider. In the present disclosure, it is contemplated that use of the term "customer" can include a computing device (also referred to as a "client device") used to perform operations under the control of or on behalf of the customer (e.g., to access a service provided by the computing resource service provider). Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a customer-accessible virtual machine hosted on one or more computer servers, or other computing system capable of communicating with a service provided by the computing resource service provider. In some examples, a "service" refers to an executing computer application that provides functionality to another computer application.

In some examples, a virtual machine configuration refers to a virtual machine that has been configured to support one or more operations it is expected to perform. The virtual machine configuration may be instantiated from a snapshot of a virtual machine stored at a state of execution whereby a particular set of executable software instructions is launched to the point of being ready/able to accept and/or execute function code to perform a workflow as described in the present disclosure. In some examples, a "snapshot" refers to a serialized representation (e.g., a copy) of a state of a computer system (physical or virtual) or a copy of a state of execution of a computer program stored in volatile or nonvolatile storage (e.g., RAM, persistent storage, etc.). In the present disclosure, serialization can refer to the process of transforming computer data into a format that can be stored (e.g., in a file or in memory) or transmitted and can be reconstructed to produce another instance of the original data. Thus, the serialized representation of the state of the computer system (virtual or non-virtual) may be a result of transformation of that state into a data format (e.g., binary, text, etc.) that is usable to recreate or reproduce the state of the computer system from the point at which it was serialized.

In some examples, the term "virtual machine" refers to an emulation, in software and/or hardware of a physical computer system, such that software executing in the virtual machine environment behaves as if the virtual machine were a physical computer. The virtual machine may include various virtual computer components, such as one or more virtual processors, virtual memory, or other virtual devices. The virtual processors, virtual memory, and/or other virtual device(s) may emulate a physical analogue while utilizing a share of one or more of the host computing device's physical processors, memory, or other devices to perform respective virtual functions. The virtual machines may be provided to customers of the computing resource service provider via a virtual computer system service, and the customers may run operating systems, applications and/or other such computer system entities on the virtual host.

The customer 110 may communicate to the VM configuration 104 through one or more communication networks, such as the Internet. Further, the various communications to/from the customer 110 may be orchestrated by a browser or other application executing on the customer 110. In an embodiment, the customer 110 communicates to the VM configuration 104 through one or more application programming interfaces (API). In some examples, an application programming interface may be a set of subroutine definitions, communication protocols, and/or software tools that provide a method of communication from the customer 110 and the VM configuration 104. Additionally, in some examples, the VM configuration 104 may communicate to the services A 106 and B 108 through the usage of one or more APIs.

In an embodiment, the VM configuration 104 is under the control of a service such as a serverless compute service provided by the computing resource service provider to its customers to perform various functions on behalf of the customers. Examples of serverless compute services include AWS Lambda, Google Cloud Functions, IBM Cloud Functions, Fn or Fn Project, platform-as-a-service service providers, and more. A serverless compute service may be serverless in the sense that computing resources are dynamically allocated to perform functions (also referred to as serverless compute functions, serverless functions, Lambda functions) triggered by the events such as invocation of an endpoint from a client (e.g., a web API call via a network such as the Internet). In an embodiment, a serverless compute function is triggered when a serverless compute endpoint is invoked and computing resources in which the function can run are provisioned in response to the trigger being detected. Note, however, that embodiments of the present disclosure need not be limited to use with serverless compute services, but may also be implemented on some other virtual computing service platform, such as a software container service or virtual computer system service. The computing resources utilized may be in accordance with a computing environment that is suitable to execute the function. The computing resources can be physical, which may include physical server computers, or virtual, which may include virtual machines. For example, if the function being triggered is written in the Java programming language, the serverless compute service may allocate a Java Virtual Machine as the resource to run the coded function.

In an embodiment, the customer 110 invokes the function 102 via an API call to perform a specified workflow. The function 102 may comprise one or more operations; these operations may require the usage of various services, such as the service A 106. In an embodiment, the function 102 comprises the performance of one or more operations, and a storage of the state of the function 102 following the performance of the one or more operations.

In various embodiments, the state of the function 102 (and other states described in the present disclosure) may be stored with a storage service, such as on-demand data storage service, a block storage service, archive data storage service, database, or other storage on persistent (non-volatile) storage or non-persistent (volatile) storage. Examples of persistent storage media include one or more of magnetic media (e.g., hard disk drive, a floppy disk drive along with associated removable media), optical media (e.g., compact disc (CD), a digital versatile disc (DVD), Blu-ray disc, etc.), flash memory (e.g., solid-state drive, etc.), holographic data storage, and other like storage media. Examples of non-persistent storage media include static and dynamic random access memory.

The function 102 may require additional operations to perform the specified workflow; the service A 106 may comprise one or more of the additional operations. For example, rather than remaining idle while waiting for a response from service A 106, the function 102 may store its state (e.g., in memory or persistent storage) and terminate after calling the service A 106 (e.g., making a request for the service A 106 to perform its one or more of the additional operations) and providing the service A with an invoke handle to a stored state of the function 102 such that the service A, upon completion of its task, can re-invoke the function 102 using the invoke handle. In the present disclosure, the request for the service A 106 to perform its one or more additional operations may be referred to as an "operation request." In embodiments, the operation request is an asynchronous operation request in that the request is for another entity (e.g., the service A 106, the customer 110, etc.) to perform one or more operations that are time-consuming enough that there is value (e.g., in terms of cost to the computing resource service provider or customer of the computing resource service provider) for the function/virtual machine to free up its allocated real or virtual resources until the entity completes performance of the one or more operations. In some examples, the stored state may be stored in persistent storage, accessible through one or more data storage services and/or systems via an invoke handle. In an embodiment, an invoke handle is a data object that comprises a reference to a resource, such as a snapshot and/or variations thereof. In some examples, an invoke handle may be a uniform resource identifier (URI) that utilizes the uniform resource name (URN) format.

In an embodiment, the invoke handle may be passed to the service A 106 from the function 102 through the usage of one or more communication networks, and may utilize an API to facilitate the communications. The service A 106 may perform one or more operations as part of the specified workflow. In some examples, the service A 106 may perform one of one or more services including data processing, data storage, applications, interfaces, permissions, security policies, encryption and/or other such services. In an embodiment, the function 102 is suspended while the service A 106 performs the one or more operations. In some examples, the function 102 may be suspended by storage of the function 102 state and subsequent termination of the virtual machine instance the function 102 was executing on.

In an embodiment, the stored state may be invoked by the usage of an invoke handle by the service A 106. For example, following the performance of the one or more operations, the service A 106 may pass the various results of the one or more operations the service A 106 performs to the function 102, which may have been suspended. In an embodiment, the function 102 is re-instantiated, or awakened, by the service A 106 making a call (e.g., API call) to a serverless compute service or other service that executes the function using the invoke handle to the stored state of the function 102 in order to instantiate the function 102A. In addition to the invoke handle, the service A 106 may pass various results of its one or more operations to the function 102A. In this manner, the re-instantiated function 102A may utilize various results of the one or more operations the service A 106 comprises, to perform one or more functions and/or operations as part of the specified workflow. Additionally, in some embodiments, the instantiation of the function 102A may comprise the instantiation of another virtual machine instance to perform one or more functions the function 102A may comprise. In other embodiments, the stored state may include a snapshot of the virtual machine instance that was executing the function 102 at the time the state was stored, such that upon invocation of the invoke handle, the virtual machine instance is revived as well. Note, however, that the virtual machine may be revived to execute on a different physical computing device (also referred to as a "host") from the physical computing device that was executing the virtual machine prior to the snapshot.

The function 102A may comprise one or more operations; as noted above, these operations may require the usage of various services, which may include as the service B 108 in addition to service A 106. As also noted above, in an embodiment, the function 102A comprises the performance of one or more operations, and a storage of a second state of the function 102A following the performance of the one or more operations. The second stored state, which in some examples can be referred to as a continuation, may require additional operations to perform the specified workflow, and the service B 108 may comprise one or more of the additional operations. For example, rather than remaining idle while waiting for a response from service B 108, the function 102A may store its state (e.g., in memory or persistent storage) and terminate after calling the service B 108 (e.g., making a request for the service B 108 to perform its one or more of the additional operations). As similar to above, in the present disclosure, the request for the service B 108 to perform its one or more additional operations may be referred to as an "operation request." In embodiments, the operation request is an asynchronous operation request in that the request is for another entity (e.g., the service B 108, the customer 110, etc.) to perform one or more operations that are time-consuming enough that there is value (e.g., in terms of cost to the computing resource service provider or customer of the computing resource service provider) for the function/virtual machine to free up its allocated real or virtual resources until the entity completes performance of the one or more operations. As explained above, in some examples, the second stored state may be stored in persistent storage, accessible through one or more data storage services and/or systems via an invoke handle. In embodiments, the invoke handle to the second stored state may be different from the invoke handle to the previous stored state. In other embodiments, the second stored state may overwrite the previous stored state, and in such embodiments the invoke handle to the second stored state may be the same as the previous invoke handle. In other embodiments, the invoke handle to the stored state of the function 102A is the same as the invoke handle to the stored state of the function 102, such that usage of the invoke handle causes the most-recently stored state of the function to be invoked.

In an embodiment, the invoke handle may be passed to the service B 108 from the function 102A through the usage of one or more communication networks, and may utilize an API to facilitate the communications. The service B 108 may perform one or more operations as part of the specified workflow. In some examples, the service B 108 may one of one or more services including data processing, data storage, applications, interfaces, permissions, security policies, encryption and/or other such services. In an embodiment, the function 102A is suspended while the service B 108 performs the one or more operations. In some examples, the function 102A may be suspended by a termination of the virtual machine instance upon which the function 102A was executing.

In an embodiment, the stored state may be accessed by the usage of an invoke handle. For example, following the performance of the one or more operations, the service B 108 may pass the various results of the one or more operations the service B 108 comprises to the function 102A, which may have been suspended. In an embodiment, the function 102A is re-instantiated, or awakened, by the service B 108 making a call (e.g., API call) to a serverless compute service or other service that executes the function using the invoke handle to the stored state of the function 102A in order to instantiate the function 102B. In addition to the invoke handle, the service B 108 may pass various results of its one or more operations to the function 102B. In this manner, the re-instantiated function 102B may utilize various results of the one or more operations the service B 108 comprises, to perform one or more functions and/or operations to complete the specified workflow. Additionally, in some embodiments, the instantiation of the function 102B may comprise the instantiation of a virtual machine instance to perform one or more functions the function 102B may comprise. In other embodiments, the stored state may include the virtual machine instance that was executing the function 102 at the time the state was stored, such that upon invocation of the invoke handle, the virtual machine instance is revived as well. In an embodiment, the function 102B completes the specified workflow and returns the one or more results of the specified workflow to the customer 110; following the completion of the function 102B, the virtual machine instance instantiated to perform the one or more functions the function 102B may comprise may be terminated (e.g., by exiting and relinquishing any allocated resources). Note that although FIG. 1 depicts two services, service A 106 and service B 108, it is contemplated that the techniques described above may involve only a single service or many services beyond two.

One example use case of a system depicted in FIG. 1 may be that of an online ordering system. The customer 110 may place an order for a product or service via the function 102. In order to proceed to the next stage in the workflow, the function 102 may need tax information (e.g., sales tax) about the order and may need to make a call to a tax service (e.g., the service A 106) for that information. Rather than waiting idly for the tax service to return with the tax information, the function 102 may store a saved state of itself (first saved state) and make a call to the tax service, while including an invoke handle (first invoke handle) to the first saved state. The function 102, and its host virtual machine instance may then terminate. Once the tax service determines the tax information, it may re-invoke the function (e.g., function 102A) using the first invoke handle and pass the tax information to the function 102A. In the use case, the function 102A may continue performing its workflow until it needs to make a call to a discount service (e.g., the service B 108) to find out whether the customer 110 qualifies for any discounts on the order. As with the tax service, rather than waiting idly for the discount service to return with the discount information, the function 102A may store another saved state of itself (second saved state) and make a call to the discount service, while including an invoke handle (second invoke handle) to the second saved state. The function 102A, and its host virtual machine instance may then terminate again.

Once the discount service determines the discount information, it may re-invoke the function (e.g., function 102B) using the second invoke handle and pass the discount information to the function 102B. In the use case, the function 102B may continue the workflow (e.g., providing the final price of the order, taking payment from the customer, emailing the customer with order details, etc.) to complete the order for the customer 110, and terminate upon completion.

Note that although the example 100 depicts two services, the service A 106 and the service B 108, it is contemplated that techniques described in the present disclosure may be applied to any number of services as needed to complete the workflow. Similarly, the techniques described in the present disclosure can be applied to only a single service, such as, for example, an embodiment where service A 106 is called repeatedly by the function, which stores its state to resume from the stored state when service A 106 responds with the invoke handle and its response. Additionally or alternatively, rather than awaiting a response from a service, the function may be waiting for a response from a user, such as the customer 110. For example, the function 102 may pass the invoke handle to its stored state to a user interface of the customer 110 and terminate while it waits for the customer 110 to submit a response. Along with submission of the customer's response via the user interface, the user interface may call the invoke handle to the stored state of the function 102A to allow it to continue performing the workflow with the customer's information. In this manner, the resources allocated to the function 102 are freed for use by other uses while the function 102 would otherwise be waiting idle for the customer input.

Figure 2:
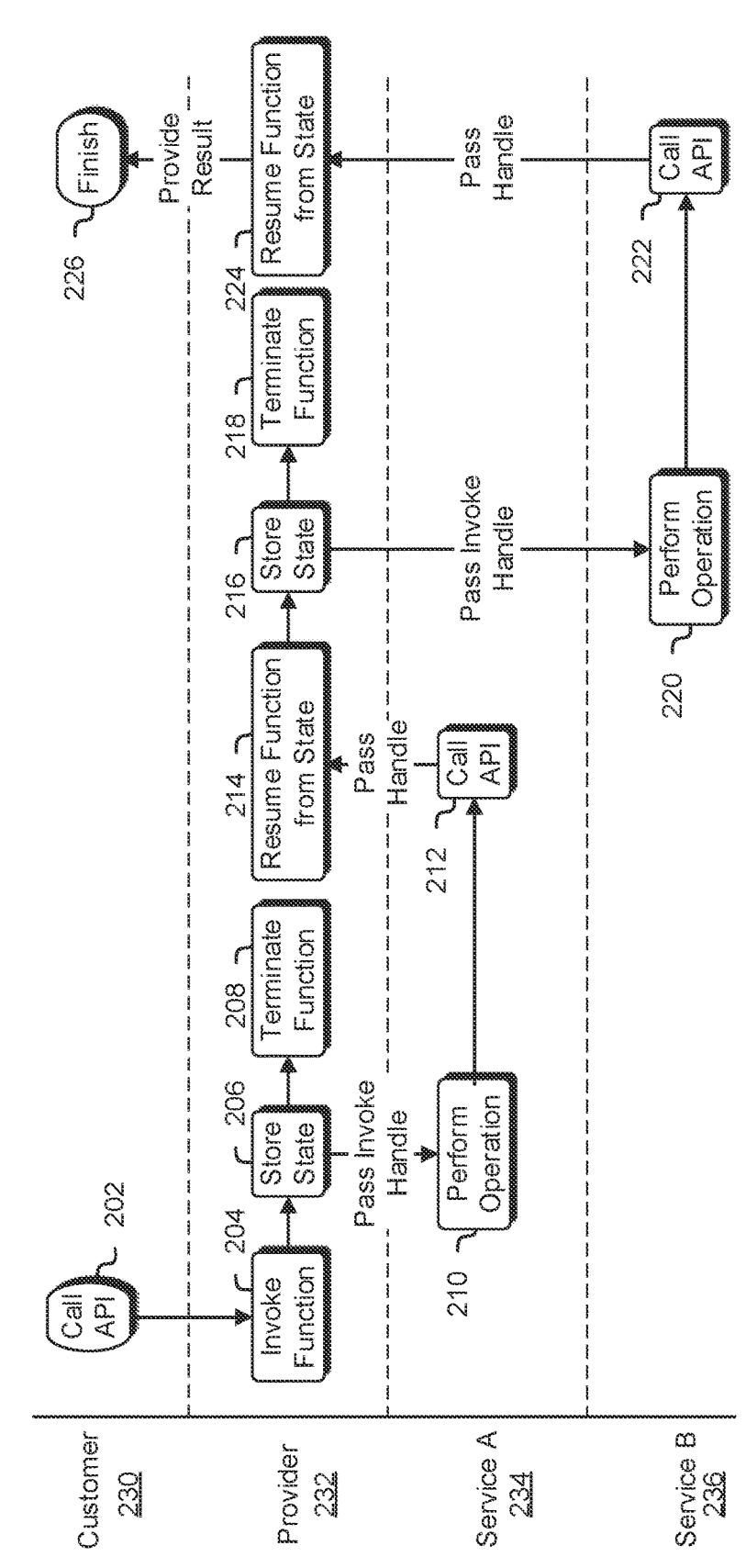
FIG. 2 is a swim diagram that illustrates an example of a continuation workflow in accordance with an embodiment.

FIG. 2 is a swim diagram illustrating an example of a process 200 for a continuation workflow in accordance with various embodiments. Some or all of the process 200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 9:
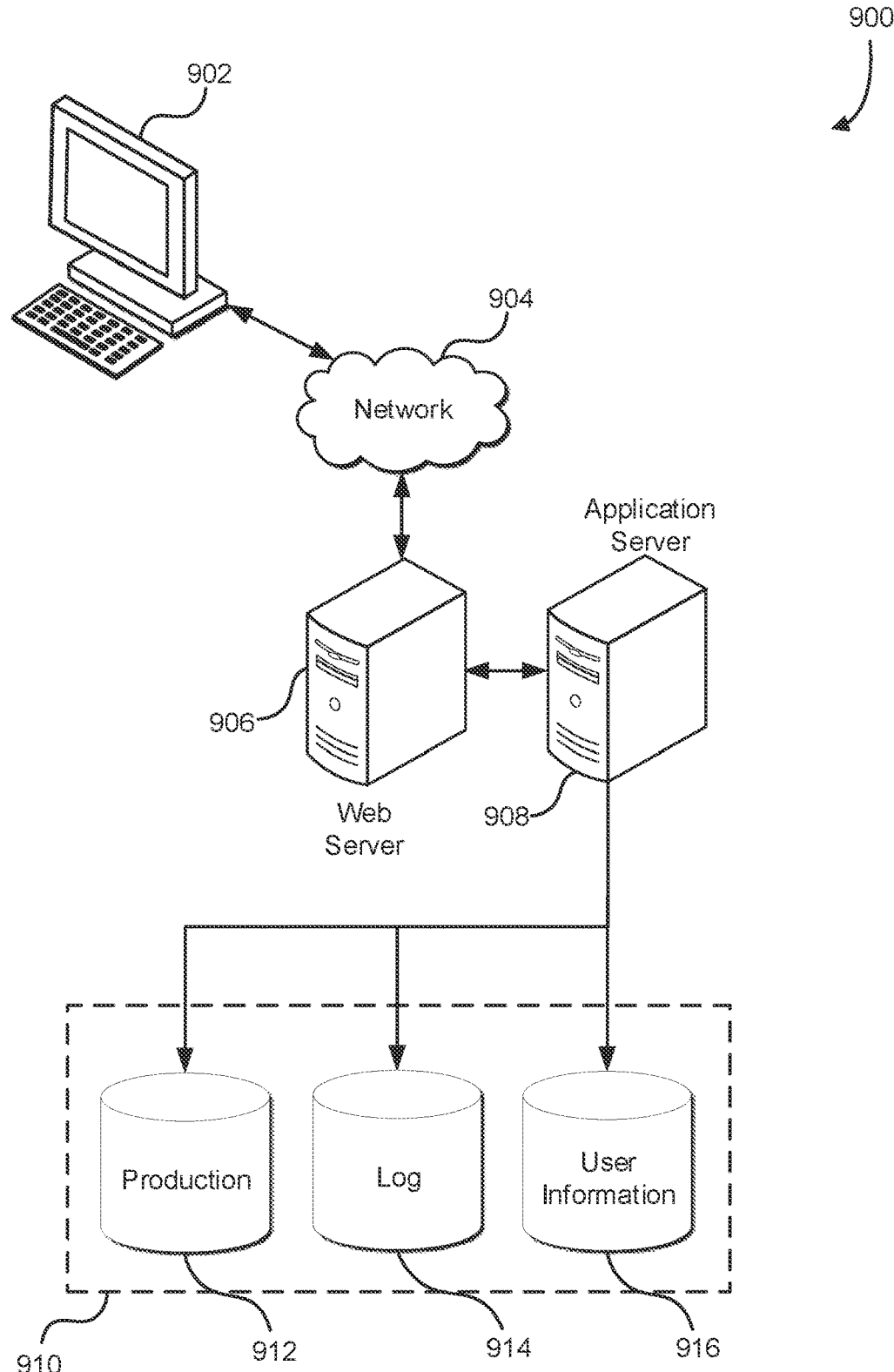
FIG. 9 illustrates a system in which various embodiments can be implemented.

For example, some or all of process 200 may be performed by any suitable system, such as a server in a data center, by various components of the system 900 described in conjunction with FIG. 9, such as the web server 906 or the application server 908, by multiple computing devices in a distributed system of a computing resource service provider, or by any electronic client device such as the electronic client device 902. The process 200 includes a series of operations wherein the system performing the process 200 utilizes a continuation workflow to execute a specified workflow.

In an embodiment, the customer 230 invokes 204 a function via an API call 202 to a virtual computing service provided by a computing resource service provider (e.g., a serverless compute service, a software container service, or virtual computer system service, etc.) to perform the specified workflow. The function may comprise one or more operations; these operations may require the usage of various services, such as the service A 234. In an embodiment, the function comprises the performance of one or more operations, and a storage 206 of the state of the function following the performance of the one or more operations. The stored state, which in some examples can be referred to as a continuation, may require additional operations to perform the specified workflow; the service A 234 may comprise one or more of the additional operations. In some examples, the stored state may be stored in persistent storage, accessible through one or more data storage services and/or systems via an invoke handle.

In an embodiment, the stored state may be accessed by the usage of an invoke handle. The invoke handle may be passed to the service A 234 from the function through the usage of one or more communication networks via an API to facilitate the communications between the provider 232 and the service A 234. The service A 234 may perform 210 one or more operations as part of the specified workflow. In some examples, the service A 234 may perform one of one or more services including data processing, data storage, applications, interfaces, permissions, security policies, encryption and/or other such services. In an embodiment, the function is terminated 208 while the service A 234 performs the one or more operations. In some examples, the function may be terminated 208 by a termination (e.g., by exiting and relinquishing any allocated resources) of the virtual machine instance on which the function was executing.

Following the performance 210 of the one or more operations, the service A 234 may pass 212 the invoke handle as well as various results of the one or more operations the service A 234 performed in order to resume the function that was previously terminated 208. The service A 234 may utilize an API call from one or more APIs through one or more communication networks to facilitate the communication of the results and usage of the invoke handle and the various results between the provider 232 and the service A 234. In an embodiment, the function is resumed 214 from the state by utilizing the invoke handle to obtain access to the stored state of the function, passed by the service A 234. The resumed function may utilize various results of the one or more operations the service A 234 performed and perform one or more functions and/or operations as part of the specified workflow.

Additionally, the resuming 214 of the function may comprise the instantiation of a second virtual machine instance different from the first virtual machine instance to perform the one or more functions of the function. The different virtual machine instances may further execute on different physical computing devices ("hosts"). In this manner, a virtual computer system service that provides the virtual machines to customers may use any available physical hosts to efficiently host the functions at different stages of the workflow.

The resumed function may comprise one or more operations; these operations may require the usage of various services, such as the service B 236. In an embodiment, the resumed function comprises the performance of one or more operations, and a storage 216 of the state of the resumed function following the performance of the one or more operations. The stored state, which in some examples can be referred to as a continuation, may require additional operations to perform the specified workflow; the service B 236 may perform one or more of the additional operations. In some examples, the stored state may be stored 216 in persistent storage, accessible through one or more data storage services and/or systems via an invoke handle.

In an embodiment, the stored state may be accessed by the usage of an invoke handle. The invoke handle may be passed to the service B 236 from the resumed function through the usage of one or more communication networks and may utilize an API to facilitate the communications between the provider 232 and the service B. The service B 236 may perform 220 one or more operations as part of the specified workflow. In some examples, the service B 236 may perform one of one or more services including data processing, data storage, applications, interfaces, permissions, security policies, encryption and/or other such services. In an embodiment, the resumed function is terminated 218 while the service B 236 performs the one or more operations. In some examples, the resumed function may be terminated 218 by a termination (e.g., by exiting and relinquishing any allocated resources) of the virtual machine instance the resumed function was executing on.

Following the performance of the one or more operations, the service B 236 may pass 222 the invoke handle as well as various results of the one or more operations the service B 236 comprises to resume the function that was previously terminated. The service B 236 may utilize an API call from one or more APIs through one or more communication networks to facilitate the communication of the results and usage of the invoke handle and the various results to the provider 232. In an embodiment, the function is resumed 224 from the state by utilizing the invoke handle to obtain access to the stored state of the function, passed by the service B 236. The resumed function may utilize various results of the one or more operations the service B 236 performed in order to perform one or more functions and/or operations to complete the specified workflow. Additionally, the resuming of the function may comprise the instantiation of a virtual machine instance to perform one or more functions the function performs.

Additionally, the resuming 214 of the function may comprise the instantiation of a third virtual machine instance different from the first and second virtual machine instances to perform the one or more functions of the function. The different virtual machine instances may further execute on different physical hosts. In this manner, a virtual computer system service that provides the virtual machines to customers may use any available physical hosts to efficiently host the functions at different stages of the workflow.

In an embodiment, the resumed function completes the specified workflow and returns 226 the one or more results of the specified workflow to the customer 230. It should be noted that in some embodiments, one or more of the operations performed in the process 200 may be performed in various orders and combinations, including in parallel.

Figure 3:
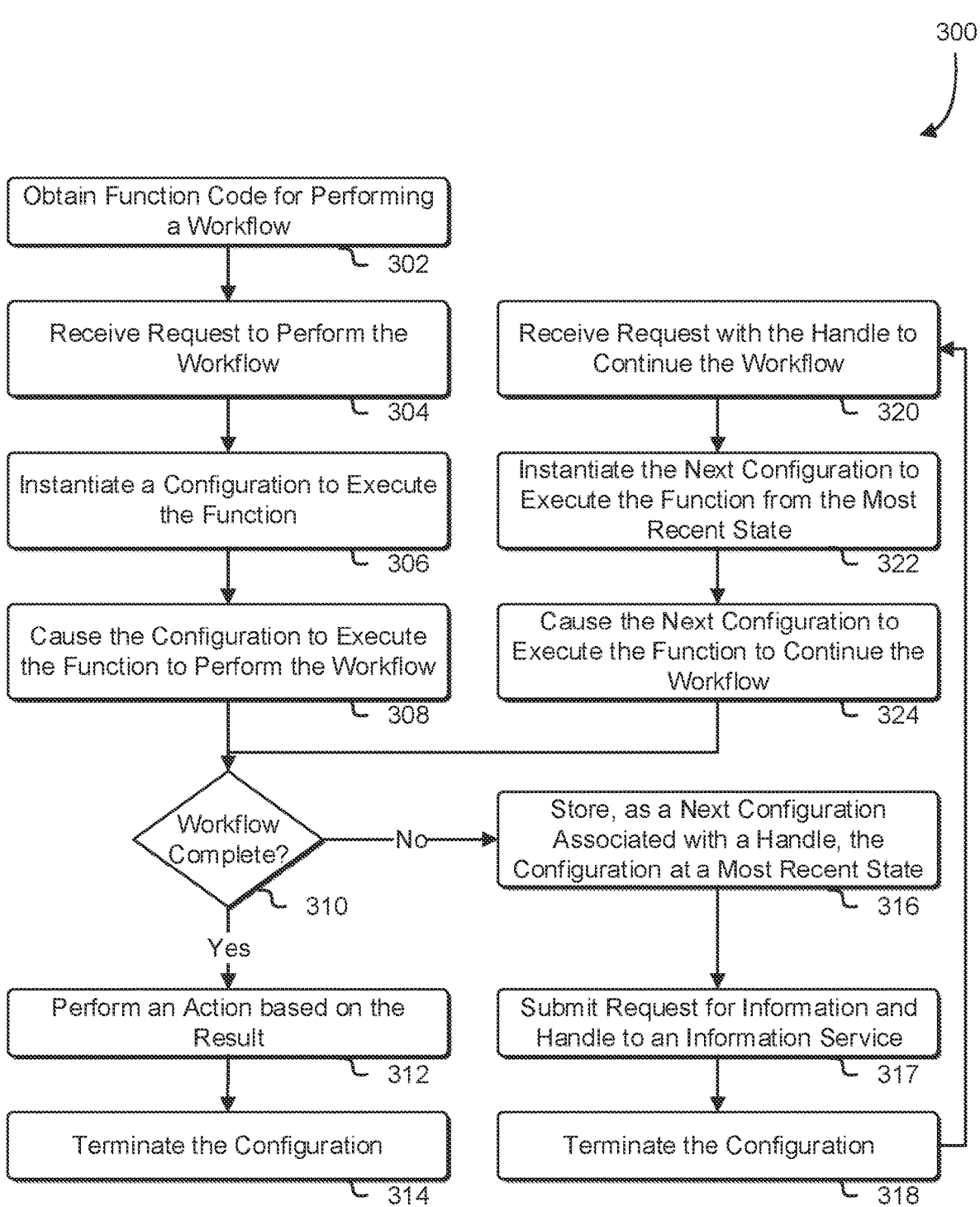
FIG. 3 is a flowchart that illustrates an example of a continuation workflow in accordance with an embodiment.

FIG. 3 is a flowchart illustrating an example of a process 300 for a continuation workflow in accordance with various embodiments. Some or all of the process 300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 300 may be performed by any suitable system, such as a server in a data center, by various components of the system 900 described in conjunction with FIG. 9, such as the web server 906 or the application server 908, by multiple computing devices in a distributed system of a computing resource service provider, or by any electronic client device such as the electronic client device 902. In some of these examples, the system is a system under the management of a virtual computing service provided by a computing resource service provider, such as a serverless compute service, a software container service, or virtual computer system service, etc. The process 300 includes a series of operations wherein the system performing the process 300 performs a workflow utilizing continuation.

In an embodiment, the system performing the process 300 obtains 302 function code for performing a workflow. In some examples, the workflow may comprise various operations to perform a desired task. Tasks may include, but are not limit to, calculations, derivations, data processing, and/or variations thereof. Additionally, the function code may comprise various operations that are utilized to perform a workflow. In some examples, the function code may comprise inputs and various operations to determine various outputs. Additionally, the function code may be written in various programming languages, such as Java, JavaScript, Python, C, C++, SQL, Ruby, Perl, and/or variations thereof and may utilize a serverless compute service such as the serverless compute service described in connection with FIG. 1.

In an embodiment, the system receives 304 a request to perform the workflow. In some examples, the system receives the request via one or more communication networks, such as the Internet. The one or more communications networks may utilize various applications, interfaces, and/or APIs to communicate the request to perform the workflow.

The system may instantiate 306 a configuration to execute the function. In some examples, the system may instantiate one or more physical systems, such as a server computer, and/or one or more virtual systems, such as a virtual machine, to execute the function. Following the instantiation of the configuration, the system may cause 308 the configuration to execute the function to perform at least a portion of the workflow. In some examples, the configuration may execute the function to perform the workflow by executing one or more programs the function may comprise. The configuration may utilize one or more applications existing on the configuration to execute the function to perform the workflow.

The system may then determine 310 if the workflow is complete. For example, if the system has received the information needed from services and other sources and has completed the workflow, the system may proceed to perform 312 an action based on the result. In some examples, the result may be an output of the performed workflow, generated as a result of the one or more functions the performed workflow comprises. The system may determine the completion of the workflow based on one or more indicators existing on the configuration. In some examples, the completion of the workflow may comprise a generation of one or more outputs; a detection of the outputs may indicate the completion of the workflow. Additionally, in some examples, the system may determine that the workflow is completed by detecting various indicators such as metadata that may be produced as a result of the completion of the workflow. For example, if the workflow involves obtaining information from one or more other services (e.g., external to the system executing the function code), the system may determine that the workflow is completed once the information from the final service is obtained and processed.

If the workflow is complete, the system may terminate 314 the configuration. In some examples, the configuration may be terminated by terminating (e.g., by exiting and relinquishing any allocated resources) the one or more systems instantiated as a result of instantiating the configuration. The configuration may comprise one or more physical systems, such as a server computer, and/or one or more virtual systems, such as a virtual machine; these systems may be terminated and/or de-allocated as a result of the termination.

On the other hand, if the system determines 310 workflow is not complete (for example, if additional information is to be obtained from additional services), the system may store 316, as a next configuration associated with a handle, the configuration at a most recent state. In various embodiments, the stored configuration may be referred to as a continuation. Additionally, in various embodiments, rather than storing the full configuration, the system may store 316 the configuration as a set of differences between the most recent configuration and a previous configuration. In this manner, the full configuration can be recreated by additively combining the previous configuration with the set of differences. For example, a first stored configuration may be a snapshot of a base configuration, a second stored configuration may comprise a first set of differences between a snapshot of the second running configuration and the snapshot of the first configuration, a third stored configuration may comprise a second set of differences between the a snapshot of the third running configuration and the combination of the first snapshot and the first set of differences, and so on.

In some examples, the system may store 316 the configuration in persistent storage, such as in one or more data storage and/or systems. Upon storage of the configuration, a handle, such as a URN, may be generated (e.g., by the data storage service or by the system performing the process 300) that refers to the stored configuration. The handle may be usable to revive the stored configuration from storage. For example, a call to a virtual computing service that includes the handle may cause the virtual computing system to determine the location in storage of the stored configuration, fetch the stored configuration from storage, and use the stored configuration to instantiate a virtual machine and the function to resume execution from the state at which the stored configuration was stored. As noted above, the virtual machines may not necessarily be instantiated on the same physical hosts, thereby allowing different stages of the functions to be performed by different physical hosts of a distributed computing system.

Additionally, the workflow may require one or more operations that may be performed by one or more additional services, such as the service A 106 and service B of FIG. 1. Such one or more additional services may include data processing, data storage, applications, interfaces, permissions, security policies, encryption and/or other such services. In some examples, the performance of the one or more additional services may comprise submitting 317 a request to a service and passing the handle, which may be denoted as an invoke handle, to the service. In this manner, the service can re-instantiate the configuration upon completion of its one or more operations. In various embodiments, the system may terminate 318 the configuration to avoid any unnecessary computational or other resource costs that may be incurred to manage an active configuration.

The system may receive 320 a request with the handle to continue the workflow. In various embodiments, the request may originate from the service to which the request 317 was submitted. Using the handle, the system may then instantiate 322 the next configuration to execute the function from the most recent state. In some examples, instantiating the next configuration may comprise preparing one or more physical systems, such as a server computer, and/or one or more virtual systems, such as a virtual machine to execute the function. In an embodiment, the system utilizes the handle the request comprises to instantiate the next configuration;

the handle the request may provide the system with access to the most recent state of the previous configuration.

In an embodiment, the system performing the process 300 causes 324 the next configuration to execute the function to continue the workflow. In some examples, the configuration may execute the function to perform the workflow by executing one or more programs the function may comprise. The configuration may utilize one or more applications existing on the configuration to execute the function to perform the workflow. Following the execution of the function, the system again determines 310 if the workflow is complete, and, if so, performs the operations of 312 and 314 as described in the preceding paragraphs. If the workflow requires information from an additional service, the system may proceed to repeat the operations of 316-324 for the additional service. It should be noted that in various embodiments, one or more of the operations performed in the process 300 may be performed in various orders and combinations, including in parallel. For example, in some embodiments the function code for performing the workflow is received with the request to perform the workflow, and as such the operations of 302-04 may be combined.

Figure 4:
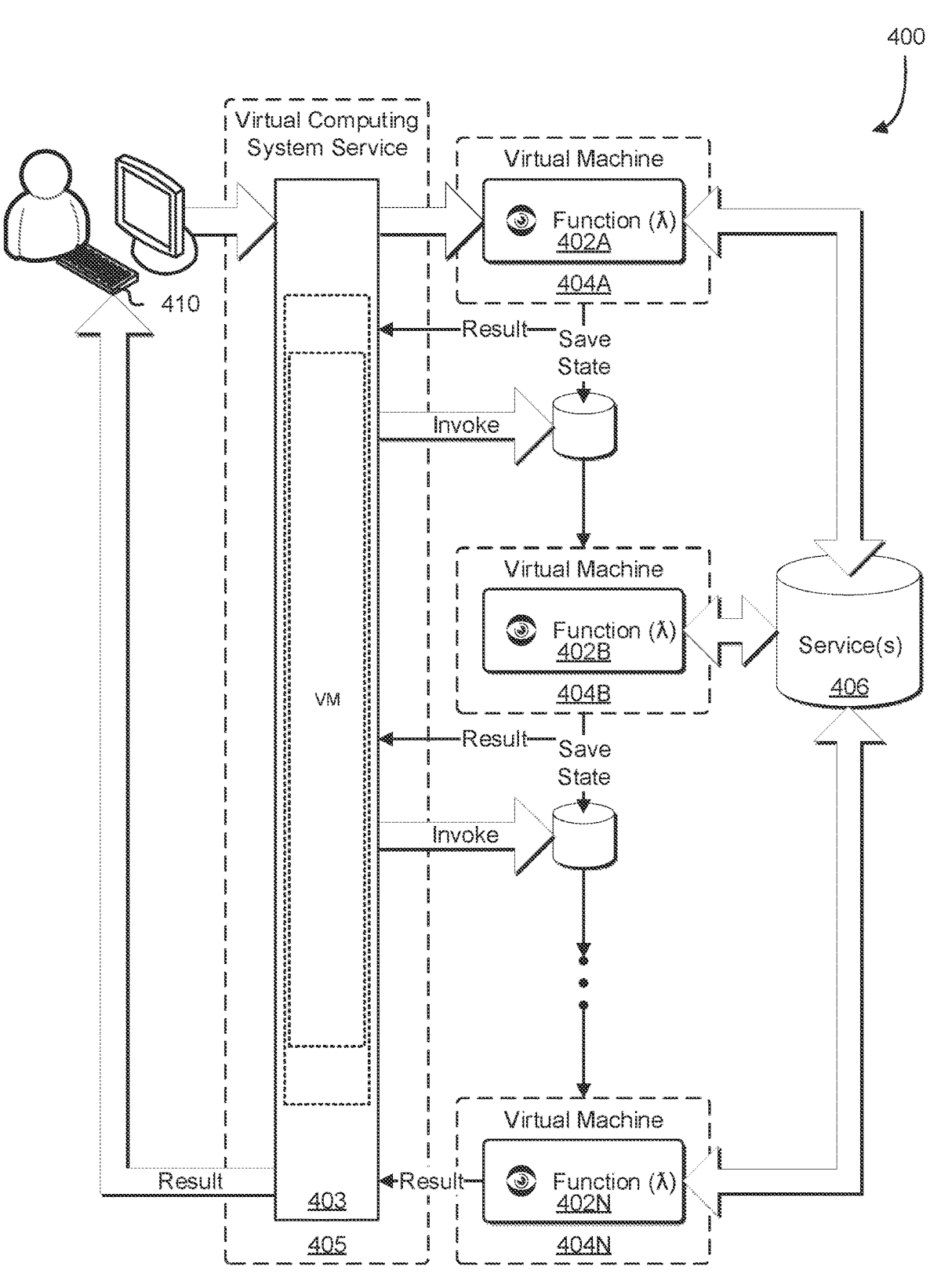
FIG. 4 illustrates an example of chaining virtual machines in accordance with an embodiment.

FIG. 4 illustrates an example of chaining virtual machines in accordance with an embodiment. Specifically, FIG. 4 depicts an example 400 of a system in which a customer 410 causes a VM configuration of a virtual computer system service 405 to utilize chained virtual machines continuations to perform a specified workflow. In an embodiment, the customer 410 is similar to the customer 110 of FIG. 1. For example, the customer 410 may be an individual, group of individuals, business entity or other organization that has a business relationship with the computing resource service provider, and/or a computing device used by the aforementioned entities to perform operations under the control of or on behalf of the customer. The customer 410 may communicate to the virtual computing system service 405 through one or more communication networks, such as the Internet. Further, the various communications to/from the customer 410 may be orchestrated by a browser or other application executing on a client device of the customer 410.

In an embodiment, the virtual computer system service 405 is used by a computing resource service provider for providing computer system resources for customers. The virtual computer system service may provide such computer system resources by instantiating virtual machine instances on physical hardware. The physical hardware may include physical hosts, which may include any device or equipment configured to execute instructions for performing data computation, manipulation or storage tasks, such as a computer or server similar to the electronic client device 902 and the application server 908 described in conjunction with FIG. 9. A computing resource service provider may provide access to computer systems using a service such as a virtual computer system service that may be a collection of computer resources configured to instantiate virtual machine instances on behalf of a customer. The customer may interact with the virtual computer system service to provision, place and operate virtual machine instances that are instantiated on physical computer devices hosted and operated by the computing resource service provider.

In an embodiment, the customer 410 communicates to the virtual computing system service 405 through one or more APIs. In some examples, an application programming interface may be a set of subroutine definitions, communication protocols, and/or software tools that provide a method of communication from the customer 410 and the virtual computing system service 405. In an embodiment, the virtual computing system service 405 comprises services such as a serverless compute service that performs various functions. In an embodiment, a serverless compute function is triggered when a serverless compute endpoint is invoked and computing resources in which the function can run are provisioned in response to the trigger being detected. The computing resources may be in accordance with a computing environment that is suitable to execute the function. The computing resources can be physical, which may include physical server computers, or virtual, which may include virtual machines.

In an embodiment, the customer 410 causes a virtual machine 403 managed by the virtual computer system service 405 to invoke the first stage 402A of a function via an API call to perform a specified workflow. For example, the customer 410 may be an administrator of the virtual machine 403 and may cause the virtual machine 403 to initiate the workflow (e.g., a database operation, etc.) associated with the stages 402A-02N of the function via a graphical user interface (GUI) to the virtual machine 403. In some examples, a database is an organized collection of data, such as tables, queries, reports, views, and other stored objects. As another example, the virtual machine 403 may be hosting a web-based online marketplace, and the customer 410 may be an individual conducting a transaction via the web-based online marketplace, and one or more interactions with the web-based online marketplace causes the virtual machine 403 to initiate a workflow associated with the stages 402A-02N of the function to perform transactional operations.

In some examples, the invocation by the virtual machine 403 of the stages 402A-02N of the function may comprise causing virtual machines 404A-04N to be instantiated (e.g., within the virtual computer system service 405 or some other computing system service, such as an event-driven, serverless compute service) to execute the stages 402A-02N of the function, starting with a first stage 402A of the function. In various embodiments, the virtual machines 404A-04N are not necessarily instantiated on the same physical host. The first stage 402A of the function may include an instantiation of the virtual machine 404A to perform the first stage 402A of the function.

In an embodiment, the first stage 402A of the function comprises the performance of one or more operations; these one or more operations may require the usage of one or more services 406 (e.g., other than the virtual computer system service 405), which may comprise one of one or more services including data processing, data storage, applications, interfaces, permissions, security policies, encryption and/or other such services. For example, the specified workflow may comprise a multi-stage analysis of a large amount of data stored within the one or more services 406. The first stage 402A of the function may utilize the one or more services 406 retrieve a portion of the data, and produce results based upon an analysis of the data. In various examples, the results of the first stage 402A of the function may be provided to the virtual machine 503 and/or other service or entity for additional processing. The state of the first stage 402A of the function may be saved and stored following the performance of the one or more operations of the first stage 402A of the function.

Additionally or alternatively, in various examples the results of the first stage 402A of the function may be stored with its state such that the results are accessible to the next stage of the function upon revival from the stored state. In some examples, the stored state may be stored in persistent storage, such as a data storage system and/or service accessible to the virtual computing system service 405, and may be accessible via an invoke handle that may be passed from the first stage 402A of the function to the virtual machine 403. Following the performance of the one or more operations of the first stage 402A of the function and the passing of the handle to the virtual machine 403, the virtual machine 404A may be terminated (e.g., by exiting and relinquishing any allocated resources).

At a time when the next stage of the workflow is to be performed (e.g., by the second stage 402B of the function), the second stage 402B may be invoked using the passed invoke handle as described in the present disclosure. In some embodiments, the customer 410 may invoke the second stage 402B of the function on demand (e.g., via a GUI). In other embodiments, the virtual machine 403 may invoke the second stage 402B of the function upon completion of its processing of the results the virtual machine 403 received from the first stage 402A of the function. In an embodiment, the second stage 402B of the function is instantiated utilizing the saved state of the first stage 402A of the function accessed via the invoke handle. The second stage 402B of the function may resume performance from the point at which the state of the first stage 402A of the function was stored. In some examples, the invocation of the second stage 402B of the function comprises an instantiation (e.g., by a virtual computer system service, software container service, serverless compute service, etc.) of the virtual machine 404B to perform the second stage 402B of the function.

In an embodiment, the second stage 402B of the function comprises the performance of one or more operations; these one or more operations may require the usage of the one or more services 406, which may comprise data processing, data storage, applications, interfaces, permissions, security policies, encryption and/or other such services. For example, referring back to the above example, the specified workflow may comprise a multi-stage analysis of a large amount of data stored within the one or more services 406. The second stage 402B of the function may utilize the one or more services 406, retrieve another portion of the data, and produce results based upon an analysis of the data.

In various examples, the results of the second stage 402B of the function may be returned to the virtual machine 403 for additional processing. Additionally, the state of the second stage 402B of the function may be saved and stored following the performance of the one or more operations. Additionally or alternatively, in various examples the results of the first stage 402A of the function may be stored with its state such that the results are accessible to the next stage of the function upon revival from the stored state. In some examples, the stored state may be stored in persistent storage, such as a data storage system and/or service accessible to the virtual computing system service 405, and may be accessible via an invoke handle that may be passed from the second stage 402B of the function to the virtual machine 403. Following the performance of the one or more operations of the second stage 402A and the passing of the handle to the virtual machine 403, the virtual machine 404B may be terminated (e.g., by exiting and relinquishing any allocated resources).

In various embodiments, the customer 410 and/or virtual machine 403 may continue to invoke and terminate functions an N number of times until final stage 402N of the function that completes the specified workflow. In some examples, the customer 410 and/or virtual machine 403 may continue to invoke and terminate any number of functions until the specified workflow is complete. Furthermore, the customer 410 may continue to instantiate and terminate virtual machines an N number of times, corresponding to the N number of functions invoked, until virtual machine 404N in which the specified workflow is complete. Continuing the above example, the specified workflow may comprise an analysis of a large amount of data stored within the one or more services 406. The customer 410 and/or virtual machine 403 may continually invoke functions and instantiate virtual machines to access portions of the large amount of data stored within the one or more services 406 until all of the desired data stored within the one or more services 406 is analyzed; the analysis of the desired data stored within the one or more services 406 may be completed with the virtual machine 404N comprising the final stage 402N of the function. Following the completion of the specified workflow, the results of the specified workflow may be returned to the customer 410 or virtual machine 403 of the virtual computing system service 405, which may return the results to the customer 410. Additionally, the virtual machine 404N comprising the final stage 402N of the function may be terminated (e.g., by exiting and relinquishing any allocated resources).

An example use case for chained virtual machine configurations as described in the present disclosure may be to process large amounts of data. For example, a large number of digital images may be stored with a storage service (e.g., the one or more services 406) and the customer 410 may seek to retrieve all of the stored digital images that contain a "blue car." The first stage 402A may retrieve a first subset of images from the one or more services 406 and determine which digital images of the first subset of images contain enough blue pixels to warrant further processing and return those digital images to the virtual machine 403. The virtual machine 403 may then examine these digital images having sufficient (e.g., exceeds a threshold) blue pixels to determine whether said blue pixels fit the shape of a "car." After the virtual machine 403 finishes processing the digital images returned by the first stage 402A of the function, the virtual machine 403 may cause the second stage 402B of the function to be invoked to retrieve a second subset of images and filter those digital images to return the ones having sufficient blue pixels to warrant further processing by the virtual machine 403. This process may continue until the last subset of images is retrieved from the one or more services 406 and processed by the final stage 402N of the function.

As another example, the virtual machine 403 may be executing a process to back up data objects and the first stage 402A of the function retrieves a first set of data objects that have not yet been backed up. In the example, the first stage 402A of the function saves its state and returns a first invoke handle to the saved state and the first set of data objects to the virtual machine 403 for backup, and terminates. In the example, after the virtual machine 403 has backed up the first set of data objects, it invokes the second stage 402B of the function sing the first invoke handle, whereupon the second stage of the function retrieves a second set of data objects that have not been backed up. Subsequently, the second stage 402B of the function saves its state and returns a second invoke handle to the saved state and the second set of data objects to the virtual machine 403 for backup, and terminates. In this example, this process may be repeated until all of the data objects are backed up.

Figure 5:
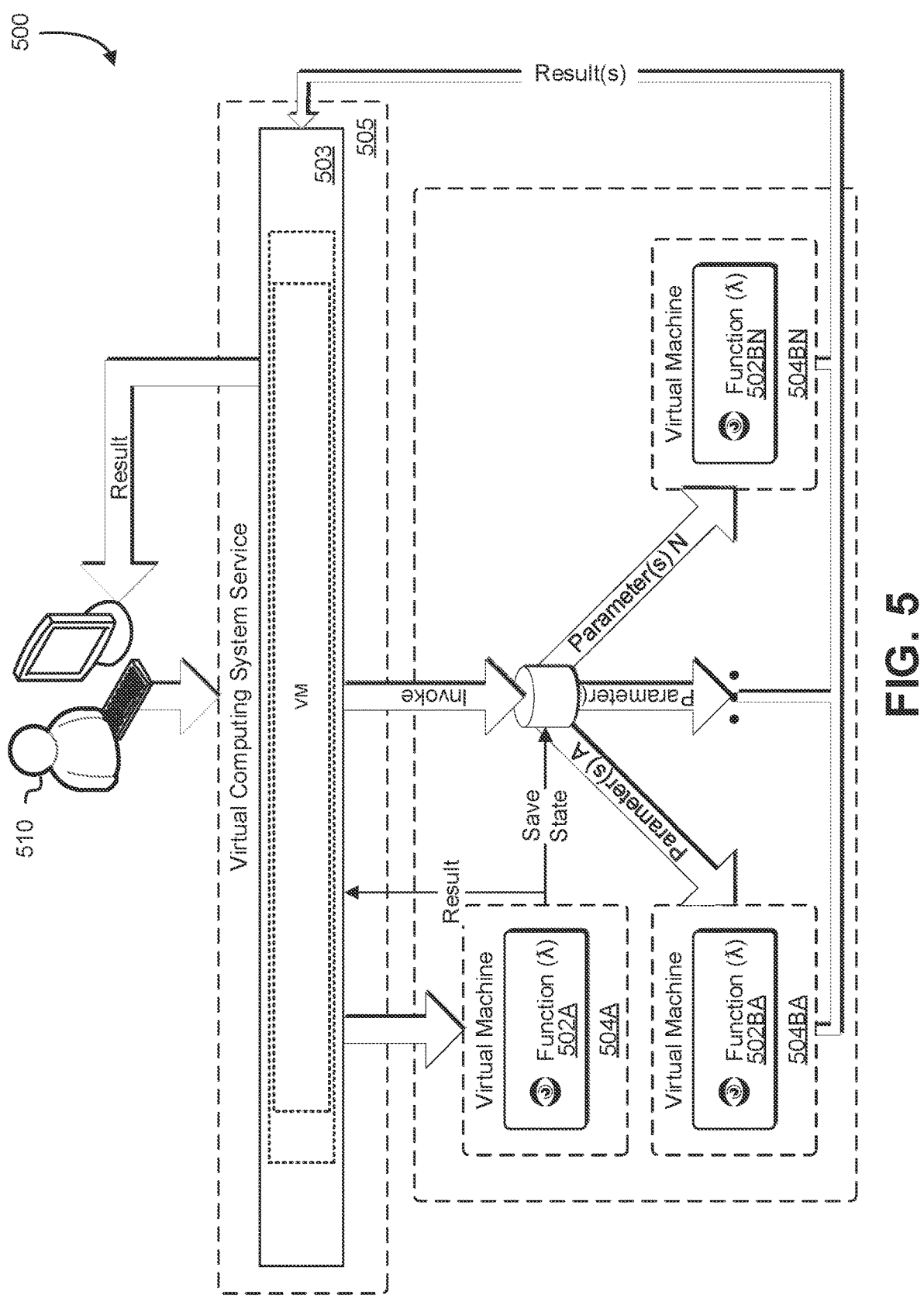
FIG. 5 illustrates an example of fanning out virtual machines in accordance with an embodiment.

FIG. 5 illustrates an example of fanning out virtual machines in accordance with an embodiment. Specifically, FIG. 5 depicts an example 500 of a system in which a customer 510 causes a virtual machine 503 of a virtual computer system service 505 to utilize fanned out virtual machines continuations in a parallel configuration in the performance of a specified workflow. In an embodiment, the customer 510 is similar to the customer 110 and the customer 410 of FIGS. 1 and 4 respectively. For example, customer 510 may be an individual, group of individuals, business entity or other organization that has a business relationship with the computing resource service provider, and/or a computing device used by the aforementioned entities to perform operations under the control of or on behalf of the customer. The customer 510 may communicate to the virtual computing system service 505 through one or more communication networks, such as the Internet. Further, the various communications to/from the customer 510 may be orchestrated by a browser or other application executing on a client device of the customer 510.

In an embodiment, the virtual computer system service 505 is similar to the virtual computer system service 405 of FIG. 4. In an embodiment, the customer 510 communicates to the virtual computing system service 505 through one or more APIs. In some examples, an application programming interface may be a set of subroutine definitions, communication protocols, and/or software tools that provide a method of communication from the customer 510 and the virtual computing system service 505. In an embodiment, the virtual computing system service 505 comprises services such as a serverless compute service that perform various functions. In an embodiment, a serverless compute function is triggered when a serverless compute endpoint is invoked and computing resources in which the function can run are provisioned in response to the trigger being detected. The computing resources may be in accordance with a computing environment that is suitable to execute the function. The computing resources can be physical, which may include physical server computers, or virtual, which may include virtual machines.

In an embodiment, the customer 510 causes a virtual machine 503 managed by the virtual computer system service 505 to invoke the first stage 502A of the function via an API call to perform a specified workflow. For example, the customer 510 may be an administrator of the virtual machine 503 and may cause the virtual machine 503 to initiate the workflow (e.g., a database operation, etc.) associated with the stages 502A-02BN of the function via a GUI to the virtual machine 503. As another example, the virtual machine 503 may be hosting a web-based online marketplace and the customer 510 may be an individual conducting a transaction via the web-based online marketplace, and one or more interactions with the web-based online marketplace causes the virtual machine 503 to initiate a workflow associated with the stages 502A-02BN of the function to perform transactional operations.

In some examples, the invocation by the virtual machine 503 of the stages 502A-02BA of the function comprises causing virtual machines 504A-04BN to be instantiated (e.g., within the virtual computer system service 505 or some other computing system service, such as an event-driven, serverless compute service) to execute the stages 502A-02BN of the function, starting with a first stage 502A of the function. The first stage 402A of the function may include an instantiation of the virtual machine 504A to perform the first stage 502A of the function. In various embodiments, the virtual machines 504A-04BN are not necessarily instantiated on the same physical host.

In an embodiment, the first stage 502A of the function comprises the performance of one or more operations, which may comprise interacting with one of one or more services (not pictured) including data processing, data storage, applications, interfaces, permissions, security policies, encryption and/or other such services. In various examples, the results of the first stage 502A of the function may be provided to the virtual machine 503 and/or other service or entity for additional processing. Additionally, the state of the first stage 502A of the function may be saved and stored following the performance of the one or more operations of the first stage 502A of the function.

Additionally or alternatively, in various examples the results of the first stage 502 of the function may be stored with its state such that the results are accessible to the next stage of the function upon revival from the stored state. In some examples, the stored state may be stored in persistent storage, such as a data storage system and/or service accessible to the virtual computing system service 505, or random access memory of a host computing device and may be accessible via an invoke handle that may be passed from the first stage 502A of the function to the virtual machine 503. Following the performance of the one or more operations of the first stage 502A of the function and the passing of the handle to the virtual machine 503, the virtual machine 504A may be terminated in a manner described in the present disclosure.

In various embodiments, the results of the first stage 502A of the function may comprise indications to perform the remaining portions of the specified workflow in parallel as a set of second stages 502BA-02BN of the function. Thus, at a time when the next stage of the workflow is to be performed, the customer 510 and/or virtual machine 503 may invoke N number of functions comprising the set of second stages 502BA-02BN of the function to perform various aspects of the specified workflow in parallel. Each of the set of second stages 502BA-02BN of the function may resume performance from the point at which the state of the first stage 502A of the function was stored, but may be configured to perform their respective operations in parallel on different data or in a different manner from the others of the set of second stages. For example, the virtual machine 503 may invoke each of the set of second stages 502BA-02BN of the function using different parameters, which may indicate different data and/or different ways of processing their respective data. Further, each of the set of second stages 502BA-02BN of the function may be invoked from the same saved state of the first stage 502A of the function.

In an embodiment, the N number of functions invoked utilizing the invoke handle passed from the first stage 502A of the function comprises instantiating N number of virtual machines, comprising virtual machine 504BA to virtual machine 504BN. In some examples, the specified workflow may comprise various operations that may be made more efficient through the usage of parallel processing. The functions comprising the set of second stages 502BA-02BN of the function may operate in a parallel configuration to provide a more efficient processing of the specified workflow. In some examples, the specified workflow may comprise operations such as data partitioning, synchronization, load balancing, and/or variations thereof; these operations may be more efficiently performed in a parallel configuration. Following the completion of the specified workflow, the results of the specified workflow may be returned to the virtual computing system service 505, which may return the results to the customer 510 and/or the virtual machine 503. Additionally, the virtual machines 504BA to 504BN instantiated to perform the functions comprising function 502BA to 502BN may be terminated.

Note too, that, depending on the particular workflow, some, all, or none of the set of second stages 502BA-02BN of the function may cause their own state to be stored and pass a handle, which can be used to invoke their respective stored state, to an entity before terminating. In this manner, depending on the particular workflow, members of the set of second stages 502BA-05BN of the function may themselves fan out third stages of the function, which in turn may fan out fourth stages of the function, and so on as would be suitable for the workflow. Additionally or alternatively, some, all, or none of the set of second stages 502BA-02BN of the function may cause their own state to be stored and pass a handle, which can be used to invoke their respective stored state in the manner described in conjunction with FIG. 4. In this manner, the embodiments illustrated in FIGS. 4 and 5 may be combined in various orders as would be suitable for performing the particular workflow of the function.

Figure 6:
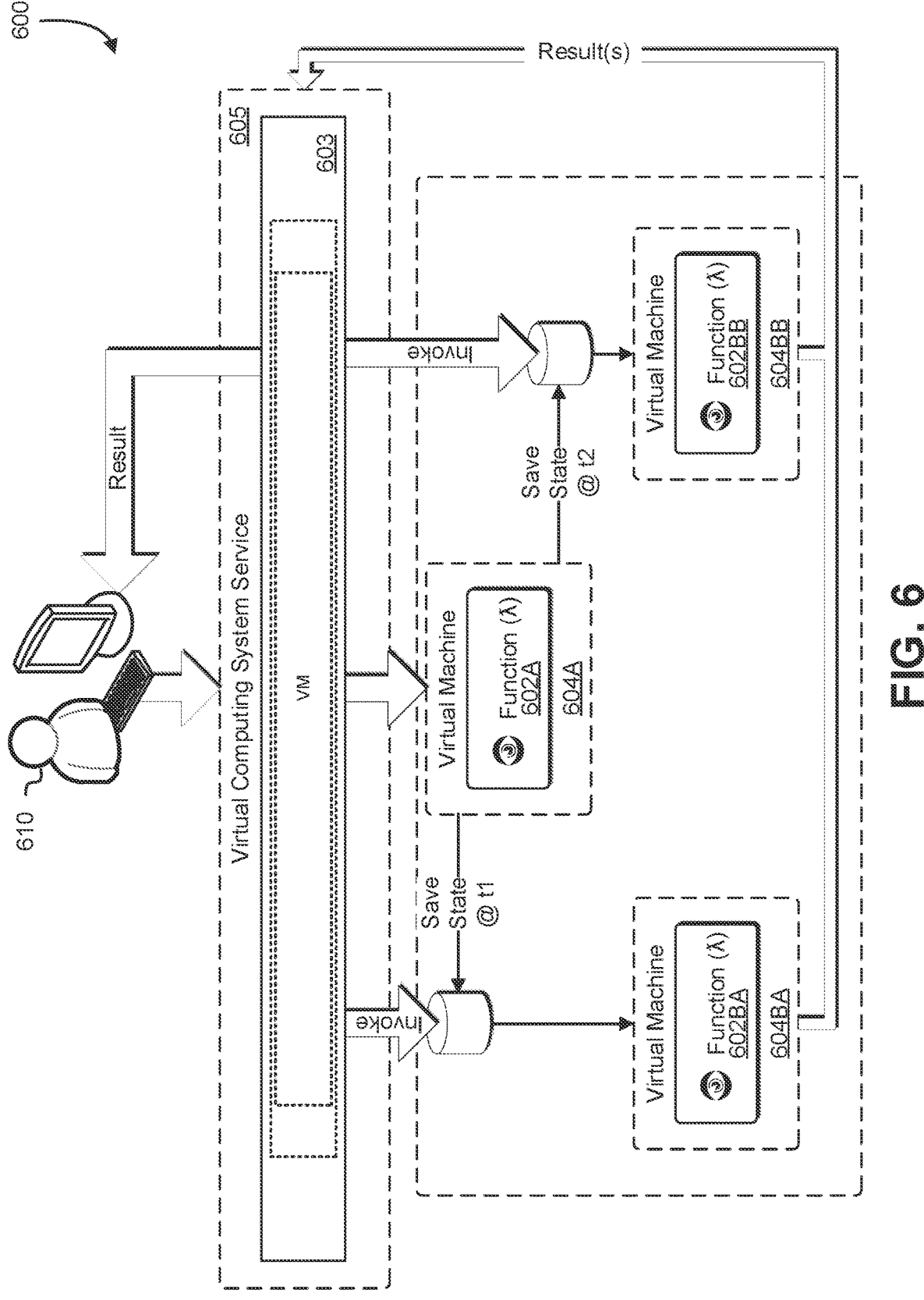
FIG. 6 illustrates an example of fanning out virtual machines in accordance with another embodiment.

FIG. 6 illustrates an example of fanning out virtual machines in accordance with another embodiment. Specifically, FIG. 6 depicts an example 600 of a system in which a customer 610 causes a virtual machine 603 of a virtual computing system service 605 to utilize fanned out virtual machines continuations in a parallel configuration in the performance of a specified workflow. In an embodiment, the customer 610 is similar to the customers 110, 410, and 510 of FIGS. 1, 4, and 5 respectively. For example, the customer 610 may be an individual, group of individuals, business entity or other organization that has a business relationship with the computing resource service provider, and/or a computing device used by the aforementioned entities to perform operations under the control of or on behalf of the customer. The customer 610 may communicate to the virtual computing system service 605 through one or more communication networks, such as the Internet. Further, the various communications to/from the customer 610 may be orchestrated by a browser or other application executing on the customer 610.

In an embodiment the virtual computing system service 605 is similar to the virtual computer system services 405 and 505 of FIGS. 4 and 5 respectively. In an embodiment, the customer 610 communicates to the virtual computing system service 605 through one or more APIs. In some examples, an application programming interface may be a set of subroutine definitions, communication protocols, and/or software tools that provide a method of communication from the customer 610 and the virtual computing system service 605. In an embodiment, the virtual computing system service 605 comprises services such as a serverless compute service that perform various functions. In an embodiment, a serverless compute function is triggered when a serverless compute endpoint is invoked and computing resources in which the function can run are provisioned in response to the trigger being detected. The computing resources may be in accordance with a computing environment that is suitable to execute the function. The computing resources can be physical, which may include physical server computers, or virtual, which may include virtual machines.

In an embodiment, the customer 610 causes a virtual machine 503 managed by the virtual computer system service 505 to invoke the first stage 602A of the function via an API call to perform a specified workflow. For example, the customer 610 may be an administrator of the virtual machine 603 and may cause the virtual machine 603 to initiate the workflow (e.g., a database operation, etc.) associated with the stages 602A-02BB of the function via a GUI to the virtual machine 603. As another example, the virtual machine 603 may be hosting a web-based online marketplace and the customer 610 may be an individual conducting a transaction via the web-based online marketplace, and one or more interactions with the web-based online marketplace causes the virtual machine 603 to initiate a workflow associated with the stages 602A-02BB of the function to perform transactional operations.

In some examples, the invocation by the virtual machine 603 of the first stage 602A of the function comprises an instantiation of the virtual machine 604A to perform the first stage 602A of the function. In an embodiment, the first stage 602A of the function comprises the performance of one or more operations, which may comprise one of one or more services including data processing, data storage, applications, interfaces, permissions, security policies, encryption and/or other such services. In various examples, the results of the first stage 602A of the function are provided to the virtual machine 603 of the virtual computing system service 605 and/or service or entity for additional processing. Additionally, the state of the first stage 602A of the function may be saved and stored following the performance of the one or more operations of the first stage 602A of the function. As depicted in FIG. 6, multiple states of the first stage 602A of the function may be saved. In embodiments, the states may be stored at different points in time; for example, a state of the first stage 602A may be saved at a first time (t1) and another state of the first stage 602A of the function may be saved at a second time (t2), thereby representing different states of the first stage 602A of the function. Each of the next stages 602BA-02BB of the function may resume performance of one or more operations from the point at which the respective states 602BA-02BB were stored.

In some examples, the stored state may be stored in persistent storage, such as a data storage system and/or service accessible to the virtual computing system service 605, or random access memory of a host computing device and may be accessible via an invoke handle that may be passed from the first stage 602A of the function to the virtual machine 603. In various embodiments, the virtual machine 604A may cause the virtual computing system service 605 to utilize the invoke handle to invoke a second stage 602BA and third stage 602BB of the function using different saved states of the first stage 602A of the function; the invocation of the function may comprise an instantiation of virtual machine 604BA and virtual machine 604BB.

In some examples, the specified workflow may comprise various operations that may be made more efficient through or require the usage of parallel processing. The functions comprising the next stages 602BA-02BB of the function may operate in a parallel configuration to perform various processes of the specified workflow. In some examples, the specified workflow may comprise operations such as data partitioning, synchronization, load balancing, and/or variations thereof; these operations may be more efficiently performed in a parallel configuration. Following the completion of the specified workflow, the results of the specified workflow may be returned to the virtual machine 603, which may return the results to the customer 610. Additionally, the virtual machines instantiated to perform the stages of the function comprising function 602BA and function 602BB may be terminated in a manner described in the present disclosure.

Note too, that, depending on the particular workflow, some, all, or none of the next stages 602BA-02BN of the function may cause their own state to be stored and pass a handle one or more times (similar to the manner described for the first stage 602A of the function), which can be used to invoke their respective stored state, to an entity before terminating. In this manner, depending on the particular workflow, members of the next stages 602BA-05BN of the function may themselves fan out third stages of the function (similar to 502BA-02BN of FIGS. 5 and 602BA-02BN), which in turn may fan out fourth stages of the function in a similar manner, and so on as would be suitable for the workflow. Additionally or alternatively, some, all, or none of the next stages 602BA-02BN of the function may cause their own state to be stored and pass a handle, which can be used to invoke their respective stored state in the manner described in conjunction with FIG. 4. In this manner, the embodiments illustrated in FIGS. 4-6 may be combined in various orders as would be suitable for performing the particular workflow of the function.

Figure 7:
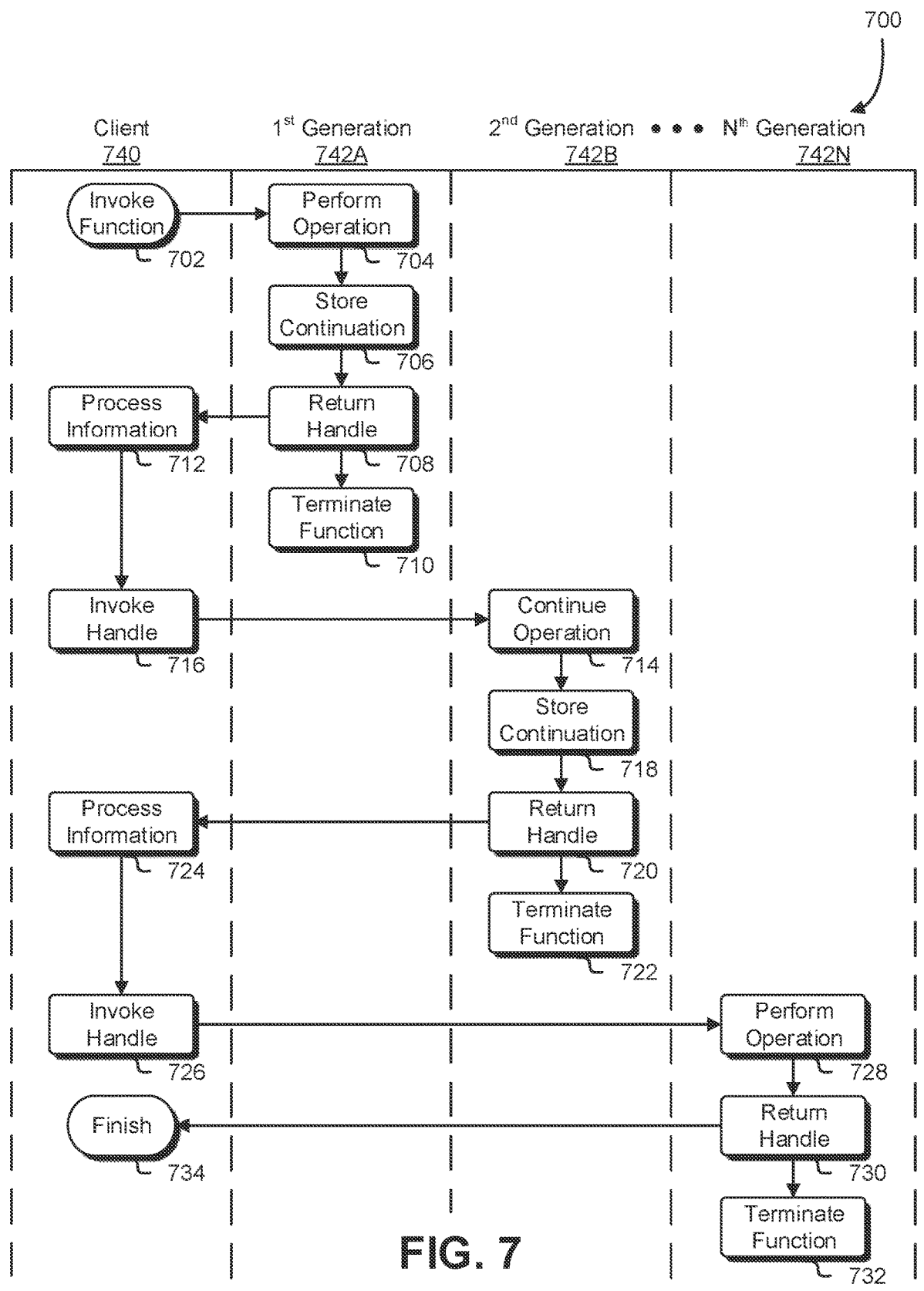
FIG. 7 is a swim diagram that illustrates an example of chaining virtual machines in accordance with an embodiment.

FIG. 7 is a swim diagram illustrating an example of a process 700 for chaining virtual machines in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the system 900 described in conjunction with FIG. 9, such as the web server 906 or the application server 907, by multiple computing devices in a distributed system of a computing resource service provider, or by any electronic client device such as the electronic client device 902. The process 700 includes a series of operations wherein a system utilizes chained virtual machines to process a specified workflow.

In an embodiment, a client 740 invokes 702 a first generation 742A of a function via an API call to perform 704 an operation the specified workflow comprises. In some embodiments, the client 740 may be a computing device operated by a customer of the computing resource service provider or other user interacting with services of the computing resource service provider. In other embodiments, the client 740 may be a virtual machine under the control of a customer of the computing resource service provider.

The first generation 742A of the function may comprise one or more operations, and may require the instantiation of a virtual machine instance to perform the function. For example, the first generation 742A of the function may comprise analyzing a portion of a large set of data. In an embodiment, the first generation 742A of the function comprises the performance of one or more operations, and a storage 706 of a continuation or state of the function following the performance of the one or more operations. The stored state, which in some examples can be referred to as a continuation, may be stored through one or more data store services and/or systems, and may be accessible through the usage of an invoke handle.

The invoke handle may be returned 708 to the client 740; the client 740 may process 712 information returned by the first generation 742A of the function to perform one or more operations as part of the specified workflow. Following the returning of the handle, the invoked function may be terminated 710. In some examples, the invoked function may be terminated by a termination of the instantiated virtual machine instance for the invoked function.

In an embodiment, the client 740 invokes 716 a handle to resume the terminated function. The terminated function may be resumed by the instantiation of a virtual machine instance to perform a second generation 742B of the function. In some examples, the invoke handle may be utilized to continue 714 the operation of the previously terminated function. For example, the previously terminated function may have comprised analyzing a portion of a large set of data; the continued operation of the second generation 742B of the function may continue to analyze additional portions of the large set of data. In an embodiment, the continued operation of the second generation 742B of the function comprises the performance of one or more operations, and a storage 718 of a continuation or state of the second generation 742B of the function following the performance of the one or more operations. The stored state, which in some examples can be referred to as a continuation, may be stored through one or more data store services and/or system, and may be accessible through the usage of an invoke handle.

The invoke handle may be returned 720 to the client 740; the client 740 may process 724 information returned by the second generation 742B of the function to perform one or more operations as part of the specified workflow. Following the returning of the handle, the second generation 742B of the function may be terminated 722. In some examples, the second generation 742B of the function may be terminated by a termination of the instantiated virtual machine instance for the function.

In an embodiment, the client 740 invokes 726 a handle to resume the terminated function. In some examples, the invoke handle may be utilized to perform 728 the operation of the function an N number of times. Additionally, resuming the function an N number of times may comprise instantiating an N number of virtual machine instances to perform the functions. In an embodiment, the client 740 continues to invoke the generations of functions based on the information returned by the previous functions. For example, the generations of functions may be utilized to analyze a large set of data; the generations of functions may be continually invoked an N number of times until the large set of data is completely analyzed. Following the completion of the operations the specified workflow comprises, the invoke handle may be returned 730, and the final generation 742N of the function may be terminated 732. Additionally, the results of the generations of functions may be returned to the client 740 to finish 734 execution. It should be noted that in various embodiments one or more of the operations performed in the process 700 may be performed in various orders and combinations, including in parallel.

FIG. 8 is a flowchart illustrating an example of a process 800 for chaining virtual machines in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as a server in a data center, by various components of the system 900 described in conjunction with FIG. 9, such as the web server 906 or the application server 908, by multiple computing devices in a distributed system of a computing resource service provider, or by any electronic client device such as the electronic client device 902. The process 800 includes a series of operations wherein the system performing the process 800 performs a workflow utilizing chaining virtual machines.

In an embodiment, the system performing the process 800 obtains 802 a function code for performing a workflow. In some examples, the workflow may comprise various operations to perform a desired task. Tasks may include, but are not limit to, calculations, derivations, data processing, and/or variations thereof. Additionally, the function code may comprise various operations that are utilized to perform a workflow. In some examples, the function code may comprise inputs and various operations to determine various outputs. Additionally, the function code may be written in various programming languages, such as Java, JavaScript, Python, C, C++, SQL, Ruby, Perl, and/or variations thereof and may utilize a serverless compute service such as the serverless compute service described in connection with FIG. 1.

In an embodiment, the system receives 804 a request to perform the workflow. In some examples, the system receives the request via one or more communication networks, such as the Internet. The one or more communications networks may utilize various applications, interfaces, and/or APIs to communicate the request to perform the workflow. The system may instantiate 806 a configuration to execute the function. In some examples, the system may instantiate one or more physical systems, such as a server computer, and/or one or more virtual systems, such as a virtual machine, to execute the function. Following the instantiation of the configuration, the system may cause 808 the configuration to execute the function to perform the workflow. In some examples, the configuration may execute the function to perform the workflow by executing one or more programs the function may comprise. The configuration may utilize one or more applications existing on the configuration to execute the function to perform the workflow.

Following the execution of the function, the system may receive 810 information and handle to next generation, which comprises the current configuration at a most recent state. In some examples, the information received may be information generated as a result of the execution of the function. The system may then process 812 the information to determine the progress in the performance of the workflow. For example, the workflow may comprise an analysis of a large set of data. The information returned may be an analysis of a portion of the large set of data; the system may then determine that more information is needed 814 that comprises analyses of the remainder of the large set of data.

If more information is required, the system may instantiate 816 the next generation (as a new current configuration) to execute the function from the most recent state. The next generation may utilize the handle to execute the function to perform additional processes of the workflow. Referring to the above example, the workflow may comprise an analysis of a large set of data. A portion of the large set of data may have been analyzed by the previous configuration; the next generation may execute the function from the most recent state to resume the analysis of the large set of data to process the remainder of the large set of data.

If no more information is required, the system may determine that the performance of the workflow has finished, and the processing 818 is complete. In some examples, the results of the workflow may be returned to the system for further processing. It should be noted that, in various embodiments, one or more of the operations performed in the process 800 may be performed in various orders and combinations, including in parallel. For example, in some embodiments the function code for performing the workflow is received with the request to perform the workflow, and as such the operations of 802-04 may be combined.

Note that in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of virtual computing, by storing the state of functions and virtual machines while they are waiting for a response from other services, thereby not incurring compute costs during idle times. (2) Additionally, techniques described and suggested in the present disclosure improve the efficiency and functioning of execution of multi-stage computer programs by not restricting the computer programs to a single physical host for execution of all stages; rather, each stage of the multi-stage computer program may be executed by any available physical host that has sufficient resources to execute that stage of the computer program. In this manner, such computer programs can be launched and executed quickly in a distributed and load balanced way. (3) Techniques described and suggested in the present disclosure additionally improve the field of computing services by improving scalability of workflows because each stage of a workflow can run on a different physical host, which means the workflow can be efficiently balanced across a large fleet, avoiding the problem of a long-running workflow executed on a single host. (4) Moreover, techniques described and suggested in the present disclosure are necessarily rooted in computer technology in order to overcome problems specifically arising with computing resources (e.g., memory and/or processor time) that, even though they are sitting idle, they are unusable because they have been allocated to a virtual machine or other computer program that is waiting for a response to a query before it can continue execution of its process.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system 900 includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network 904 includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed in detail. In an embodiment, communication over the network 904 is enabled by wired and/or wireless connections and combinations thereof. In an embodiment, the network 904 includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API requests) over a network). As used, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object level interfaces. The application server 908 can include any appropriate hardware, software and firmware for integrating with the data store 910 as needed to execute aspects of one or more applications for the electronic client device 902, handling some or all of the data access and business logic for an application.

In an embodiment, the application server 908 provides access control services in cooperation with the data store 910 and generates content including, but not limited to, text, graphics, audio, video, and/or other content that is provided to a user, associated with the client device by the web server 906 in the form of HyperText Markup Language (HTML), Extensible Markup Language (XML), JavaScript, Cascading Style Sheets (CSS), JavaScript Object Notation (JSON), and/or another appropriate client-side or other structured language. Content transferred to a client device, in an embodiment, is processed by the electronic client device 902 to provide the content in one or more forms including, but not limited to, forms that are perceptible to the user audibly, visually, and/or through other senses. The handling of all requests and responses, as well as the delivery of content between the electronic client device 902 and the application server 908, in an embodiment, is handled by the web server 906 using PHP: Hypertext Preprocessor (PHP), Python, Ruby, Perl, Java, HTML, XML, JSON, and/or another appropriate server-side structured language in this example. In an embodiment, operations described as being performed by a single device are performed collectively by multiple devices that form a distributed and/or virtual system.

The data store 910, in an embodiment, includes several separate data tables, databases, data documents, dynamic data storage schemes, and/or other data storage mechanisms and media for storing data relating to a particular aspect of the present disclosure. In an embodiment, the data store 910 includes mechanisms for storing production data 912 and user information 916, which are used to serve content for the production side. The data store 910 also is shown to include a mechanism for storing log data 914, which is used, in an embodiment, for reporting, computing resource management, analysis, or other such purposes. In an embodiment, other aspects t such as page image information and access rights information (e.g., access control policies or other encodings of permissions) are stored in the data store 910 in any of the above listed mechanisms as appropriate or in additional mechanisms in the data store 910.

The data store 910, in an embodiment, is operable, through logic associated therewith, to receive instructions from the application server 908 and obtain, update, or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described or may be provided by a content management system (CMS) operating on, or under the control of, the application server 908. In an embodiment, a user, through a device operated by the user, submits a search request for a certain type of item. In this example, the data store 910 accesses the user information 916 to verify the identity of the user, accesses the catalog detail information to obtain information about items of that type, and returns the information to the user, such as in a results listing on a web page that the user is views via a browser on the electronic client device 902. Continuing with the example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically will include an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server cause or otherwise allow the server to perform its intended functions.

The system, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating systems, which in some cases can include one or more user computers, computing devices, or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, the system 900 utilizes at least one network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols. The network 904, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In an embodiment, the system 900 utilizes a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java C, C# or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system 900 includes a variety of data stores and other memory and storage media as discussed above. These can reside in a variety of locations, such as on a storage medium local to (and/or resident in) one or more of the computers or remote from any or all of the computers across the network 904. In an embodiment, the information resides in a storage-area network (SAN) familiar to those skilled in the art, and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit (CPU or "processor"), at least one input device (e.g., a mouse, keyboard, controller, touch screen, or keypad), and at least one output device (e.g., a display device, printer, or speaker), at least one storage device, such as a disk drive, an optical storage device, or a solid-state storage device such as random access memory (RAM) or read-only memory (ROM), as well as removable media devices, memory cards, flash cards, etc., and various combinations.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, system 900 and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the disclosed embodiments (especially in the context of the following claims) are to be construed to cover both the singular and the plural, unless otherwise indicated or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. In embodiment, a process such as those processes described (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium stores instructions and a main CPU executes some of the instructions while a graphics processor unit executes other of the instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implements an embodiment of the present disclosure is a single device and, in another embodiment, is a distributed computer system comprising multiple devices that operate differently such that the distributed computer system performs the operations described and such that a single device does not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A method, comprising:

causing a first virtual machine instance to execute function code to perform a first portion of a workflow without user input, the performing of the first portion resulting in:

submission of an operation request to an entity based at least in part on determining that continued performance of the workflow requires one or more data processing operations by the entity to generate a response associated with the workflow for the continued performance of the workflow, the first virtual machine instance being hosted on a server of an event driven, serverless computing system provided as a service by a computing resource service provider, and determining that a time to complete the one or more data processing operations by the entity exceeds a time threshold, and in response, determining to terminate the first virtual machine instance that would otherwise be waiting idle until a response to the operation request is received from the entity;

terminating the first virtual machine instance and freeing up computing resources allocated to the first virtual machine instance, the terminating is in response to;

a determination that the computing resources allocated to the first virtual machine instance can be terminated while awaiting the one or more data processing operations to generate the response associated with the workflow for the continued performance of the workflow, the determination that the time to complete the one or more data processing operations by the entity exceeds the time threshold, and the determination to terminate the first virtual machine instance that would otherwise be waiting idle until the response to the operation request is received from the entity;

receiving, from the entity, a resume workflow request that includes a handle that comprises a reference to a snapshot that corresponds to:

a state of execution of the workflow, and a state of execution of the function code for performing a second portion of the workflow;

causing without user input, a second virtual machine instance to perform the second portion of the workflow by executing the function code using:

the reference to the snapshot, the state of execution of the function code, and the response to the operation request, the second virtual machine instance being hosted on a server of the event driven, serverless computing system provided as a service by the computing resource service provider; and receiving, from another entity, another resume workflow request that includes another handle that comprises another reference to another snapshot that corresponds to another state of execution of the function code for performing a third portion of the workflow.

2. The method of claim 1, wherein performance of the first and the second portions of the workflow include:

storing respective first and second states of execution of function code as respective first and second snapshots; and receiving respective first and second invoke handles corresponding respectively to the first and the second snapshots, the respective first and the second invoke handles being respective references to the first and second states of execution of the function code.

3. The method of claim 2, wherein the respective first and the second invoke handles are received via an application programming interface.

4. The method of claim 1, wherein the first portion of the workflow is performed without user input in response to a workflow request to perform the workflow, wherein the workflow includes the first and second portions of the workflow.

5. The method of claim 4, wherein the workflow request includes function code and wherein the first and the second portions of the workflow correspond to execution of first and second portions of the function code.

6. The method of claim 1, wherein the first virtual machine instance executes on a first physical host and the second virtual machine instance executes on a second physical host that is different from the first virtual machine instance.

7. A non-transitory computer-readable storage medium having stored thereon executable instructions that, as a result of being executed by one or more processors of a computer system, cause the computer system to at least:

cause a first virtual machine instance to execute function code to perform a first portion of a workflow without user input, the performing of the first portion resulting in:

submission of an operation request to an entity based at least in part on determining that continued performance of the workflow requires one or more data processing operations by the entity to generate a response associated with the workflow for the continued performance of the workflow, the first virtual machine instance being hosted on a server of an event driven, serverless computing system provided as a service by a computing resource service provider, and determining that a time to complete the one or more data processing operations by the entity exceeds a threshold, and in response, determining to terminate the first virtual machine instance that would otherwise be waiting idle until a response to the operation request is received;

terminate the first virtual machine instance including exiting and relinquishing computing resources allocated to the first virtual machine instance, the terminating is in response to:

a determination that the computing resources allocated to the first virtual machine instance can be suspended until the entity completes an action of the one or more data processing operations to continue the workflow, the determination that the time to complete the one or more data processing operations by the entity exceeds the threshold, and the determination to terminate the first virtual machine instance that would otherwise be waiting idle until the response to the operation request is received;

receive, from the entity, a resume workflow request that includes a handle that comprises a reference to a snapshot that corresponds to:

a state of execution of the workflow, and a state of execution of the function code for performing a second portion of the workflow;

cause without user input, a second virtual machine instance to perform the second portion of the workflow using:

the reference to the snapshot, the state of execution of the workflow, and the response to the operation request, the second virtual machine instance being hosted on the event driven, serverless computing system provided as a service by the computing resource service provider; and receive, from another entity, another resume workflow request that includes another handle that comprises another reference to another snapshot that corresponds to another state of execution of the function code for performing a third portion of the workflow.

8. The non-transitory computer-readable storage medium of claim 7, wherein the workflow comprises execution of a set of function code, and where the snapshot represents a set of differences between a first state of execution of the set of function code and a second state of execution of the set of function code.

9. The non-transitory computer-readable storage medium of claim 8, wherein the set of function code is received with a request to perform the workflow, and wherein the first virtual machine instance performs the first portion of the workflow in response to the request to perform the workflow.

10. The non-transitory computer-readable storage medium of claim 8, wherein the set of function code further includes code that causes the first virtual machine instance to terminate in response to the first virtual machine instance providing a first handle to the entity, the first handle comprising a reference to the first state of execution of the set of function code.

11. The non-transitory computer-readable storage medium of claim 10, wherein the set of function code that causes the first virtual machine instance to terminate further causes, in response to the first virtual machine instance providing a first handle to the entity, a computing resource allocated to the first virtual machine instance to be deallocated and made available to be used by a third virtual machine instance that is different than the first and second virtual machine instances.

12. The non-transitory computer-readable storage medium of claim 7, wherein:

the computer system is hosted by the computing resource service provider; and the entity is provided by a third party outside of the control of the computing resource service provider.

13. A system, comprising:

one or more processors; and memory that stores computer-executable instructions that, as a result of being executed, cause the one or more processors to:

cause a first virtual machine instance to execute function code to perform a first portion of a workflow without user input, the performing of the first portion resulting in:

submission of an operation request to an entity based at least in part on determining that continued performance of the workflow requires one or more data processing operations by the entity to generate a response associated with the workflow for the continued performance of the workflow, the first virtual machine instance being hosted on a server of an event driven, serverless computing system provided as a service by a computing resource service provider, and determining that a time to complete the one or more data processing operations exceeds a threshold, and in response, determining to terminate the first virtual machine instance that would otherwise be waiting until a response is received from the entity;

terminate the first virtual machine instance including deallocating computing resources allocated to the first virtual machine instance so that the computing resources allocated to the first virtual machine instance are made available to be used by another virtual machine instance that is different than the first virtual machine instance, the terminating is in response to:

a determination that the computing resources allocated to the first virtual machine instance can be suspended until the entity completes an action of the one or more data processing operations to continue the workflow, and terminating is in response to:

a determination that the computing resources allocated to the first virtual machine instance can be suspended until the entity completes an action of the one or more data processing operations to continue the workflow, the determination that the time to complete the one or more data processing operations exceeds the threshold, and the determination to terminate the first virtual machine instance that would otherwise be waiting idle until the response to the operation request is obtained;

receive, from the entity, a resume workflow request that includes a handle that comprises a reference to a snapshot that corresponds to:

a state of execution of the workflow, and a state of execution of the function code for performing a second portion of the workflow;

cause, without user input, a second virtual machine instance to perform the second portion of the workflow using:

the reference to the snapshot, the state of execution of the workflow, and the response to the operation request, the second virtual machine instance being hosted on the event driven, serverless computing system; and receive, from another entity, another resume workflow request that includes another handle that comprises another reference to another snapshot that corresponds to another state of execution of the function code for performing a third portion of the workflow.

14. The system of claim 13, wherein the entity is a user interface executing on a client device of a user.

15. The system of claim 13, wherein a third virtual machine instance executes a final portion of the workflow, and wherein the third virtual machine instance determines a workflow result based on a response to the operation request to the entity.

16. The system of claim 13, wherein the handle is a uniform resource name.

17. The system of claim 13, wherein performance of the second portion of the workflow causes submission of another operation request to another separate entity.

18. The system of claim 17, wherein the computer-executable instructions further include instructions that cause the system to:

receive, from the another separate entity, another resume workflow request that includes:

a further handle that comprises the reference to the snapshot that corresponds to a further state of execution of the workflow; and a response to a further operation request; and cause, using the further handle to the snapshot and the response to the further operation request, a third virtual machine instance to perform a third portion of the workflow.

19. The system of claim 13, wherein the entity is a service of the computing resource service provider that maintains the system.

20. The system of claim 13, wherein the snapshot is stored in persistent storage provided by an on-demand data storage service.

* * * * *